United States Patent
Yoshimori et al.

(10) Patent No.: US 7,357,659 B2
(45) Date of Patent: Apr. 15, 2008

(54) CONNECTOR AND FEMALE PLUG

(75) Inventors: Naoki Yoshimori, Aichi-ken (JP); Manabu Komatsubara, Aichi-ken (JP)

(73) Assignee: Canare Electric Co., Ltd., Aichi-Gun, Aichi-Ken (JP)

( * ) Notice: Subject to any disclaimer, the term of this patent is extended or adjusted under 35 U.S.C. 154(b) by 0 days.

(21) Appl. No.: 10/553,281

(22) PCT Filed: Nov. 17, 2003

(86) PCT No.: PCT/JP03/14600

§ 371 (c)(1),
(2), (4) Date: Sep. 21, 2006

(87) PCT Pub. No.: WO2004/093261

PCT Pub. Date: Oct. 28, 2004

(65) Prior Publication Data

US 2007/0111582 A1    May 17, 2007

(30) Foreign Application Priority Data

Apr. 17, 2003   (JP)   ............................. 2003-112649
Apr. 17, 2003   (JP)   ............................. 2003-112918

(51) Int. Cl.
*H01R 13/625* (2006.01)
(52) U.S. Cl. ...................................... 439/348; 285/315
(58) Field of Classification Search ................ 439/271, 439/289, 312, 319, 348, 403, 700; 285/315, 285/316
See application file for complete search history.

(56) References Cited

U.S. PATENT DOCUMENTS 5,445,358 A * 8/1995 Anderson ................ 251/149.6
5,984,709 A * 11/1999 Zink et al. ................ 439/348
6,129,334 A * 10/2000 Kuwabara ................ 251/149.6
6,131,961 A * 10/2000 Heilmann .................... 285/316
6,206,432 B1 * 3/2001 Kamiyama ................ 285/81
6,716,048 B2 * 4/2004 Collin et al. ............... 439/317

FOREIGN PATENT DOCUMENTS

| JP | 59-140411 | 8/1984 |
| JP | 62-262709 | 11/1986 |
| JP | 06-002306 | 1/1994 |
| JP | 06-174973 | 6/1994 |
| JP | 08-183470 | 7/1996 |
| JP | 2002-323641 | 11/2002 |

* cited by examiner

*Primary Examiner*—Thanh-Tam Le
(74) *Attorney, Agent, or Firm*—McGinn IP Law Group, PLLC

(57) ABSTRACT

A coil spring 213 is sandwiched between a coil spring adjoining wall 202*a* of the female plug shell 202 and the edge of the large ring of the slide sleeve 203 and is held inside of the slide cover 215 in which the coil spring 213 can expand and contract freely. Sliding of the slide cover 215 in the positive direction of the x axis is restricted because the coil spring 213 or the slide sleeve 203 is adjacent to the coil spring adjoining wall 202*a*, and sliding in the negative direction of the x axis is restricted by a caulking 210. The caulking 210 caulks its bottom part, or the end part 215*b* which is placed at the opposite side of the opening part of the slide cover 215, to inside of the female plug 200. By applying this calking 210, problems described above can be solved.

8 Claims, 24 Drawing Sheets

$\theta_1 < \theta_2 = \theta_2$ $\phi_1 = \phi_2$

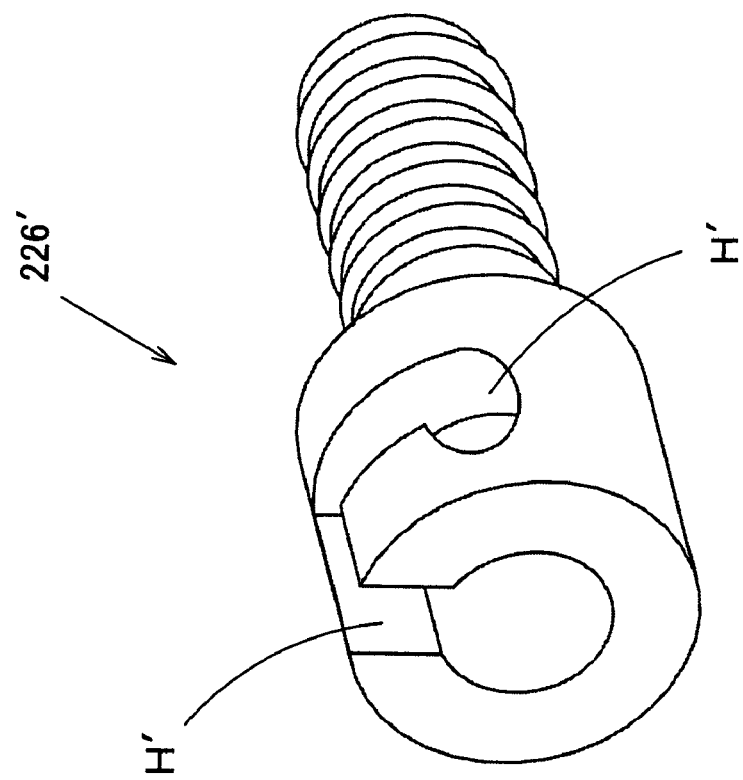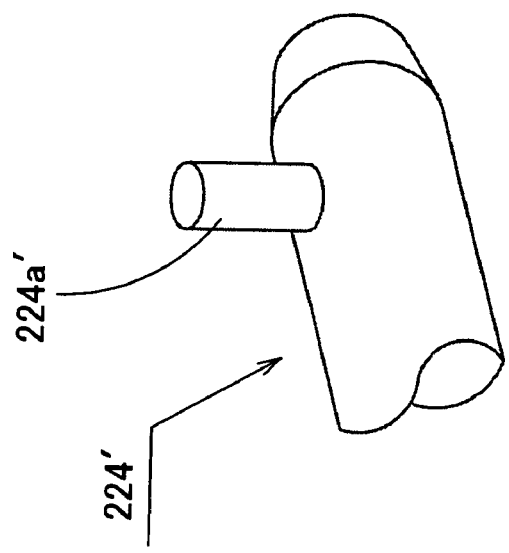
FIG. 10

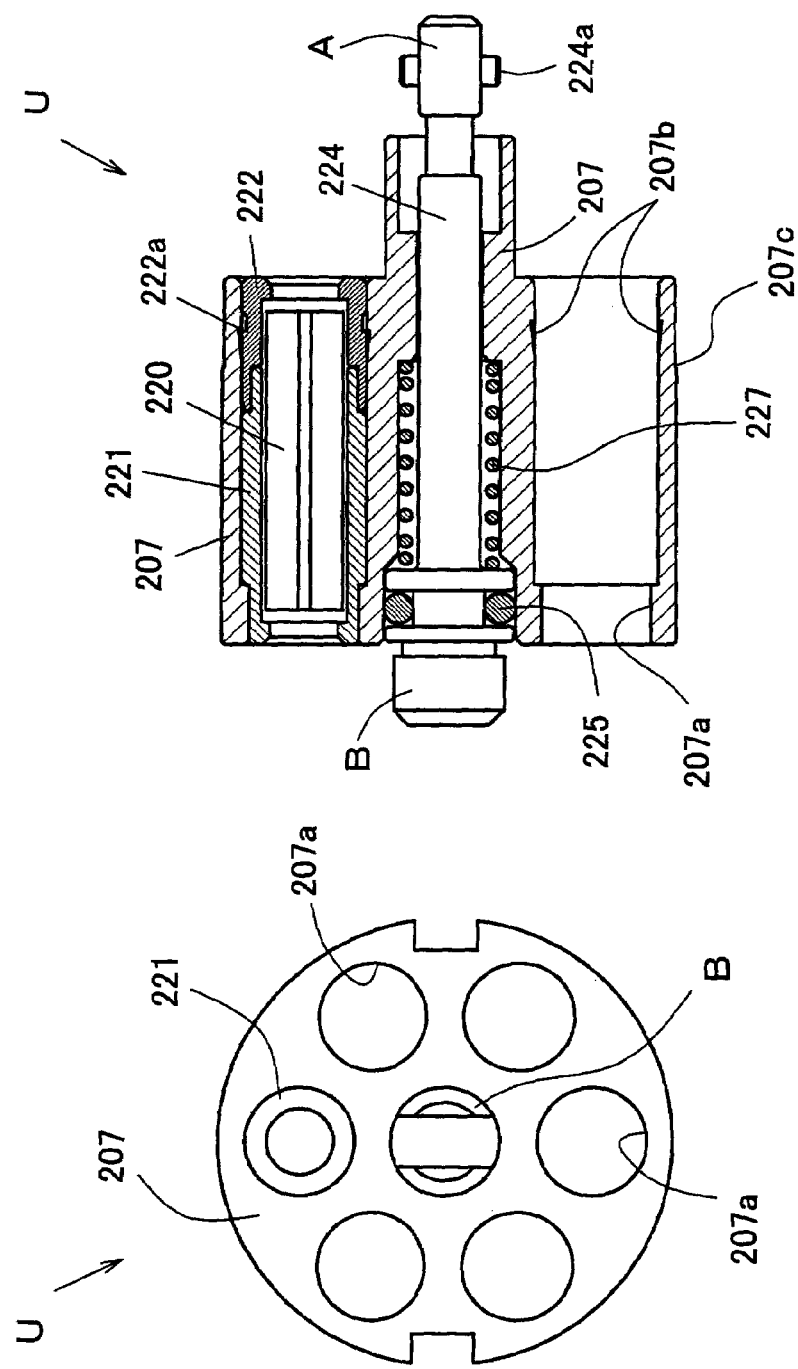

FIG. 16
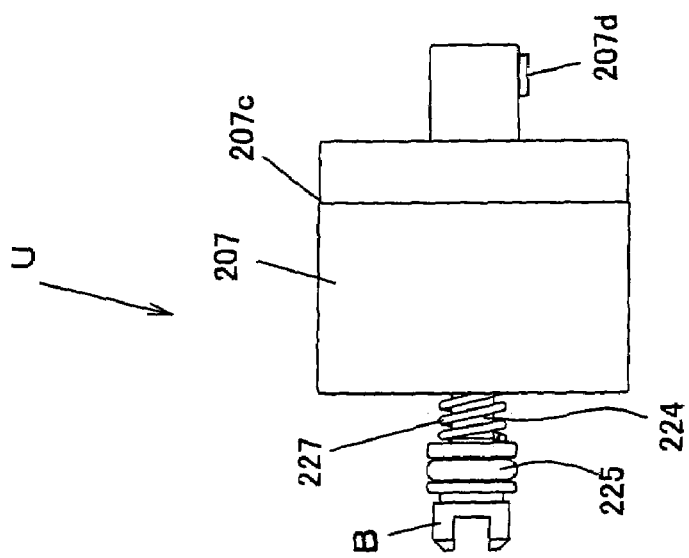
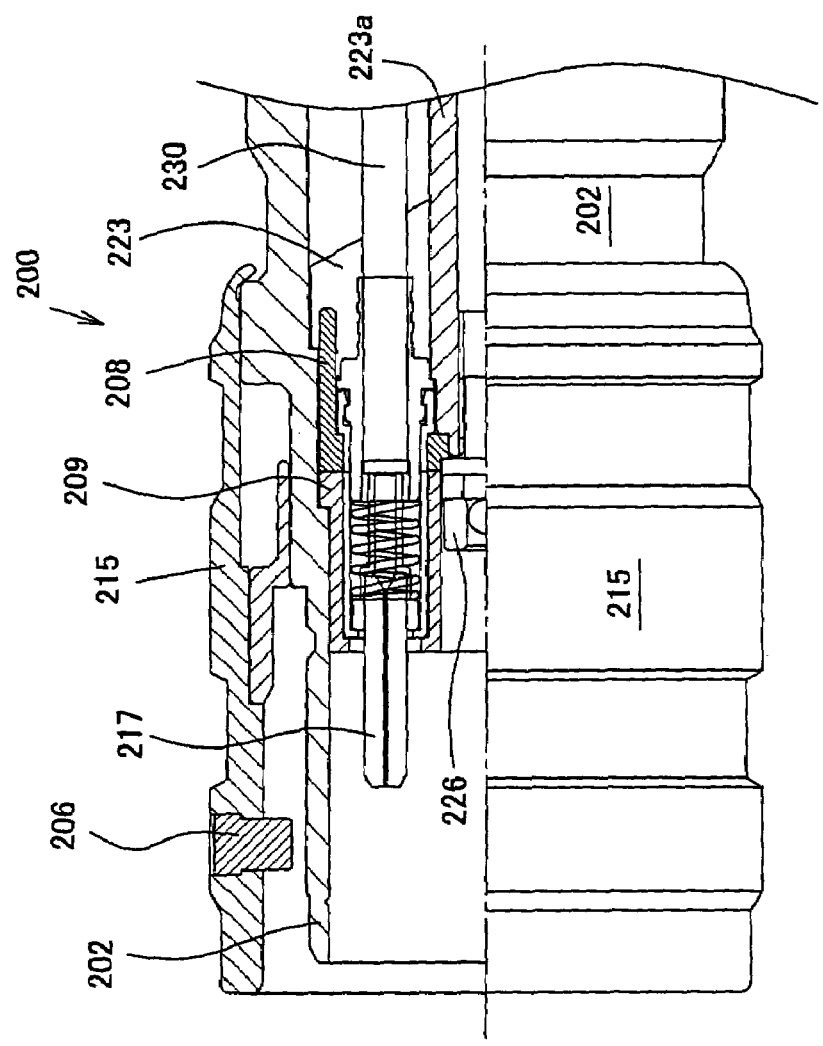

$\theta = -90°$

CONNECTOR AND FEMALE PLUG

TECHNICAL FIELD

The present invention relates to a connector which connects male and female contact parts with ball baring mechanism, the contact pants coupling lines transmitting electric power, electric signal and lights, respectively.

And the present invention relates to a female plug of an optical connector comprising an unit which maintains a facet of a pointed end of a ferrule in condition of confronting and contacting, such as a detachable adaptor unit comprising an holding member such as divide sleeve.

BACKGROUND ART

[Patent Document 1]
Japanese Utility Model Laid-open No. H2-84282
[Patent Document 2]
Japanese Utility Model Laid-open No. S60-37184
[Patent Document 3]
Japanese Utility Model Laid-open No. H6-2306
[Patent Document 4]
Japanese Utility Model Laid-open No. H6-4711

As conventional inventions about a connector having ball baring mechanism and connecting male and female contact parts which couples lines transmitting electric power, electric signal and lights, respectively, the patent documents 1, 2, and 3 described above are disclosed.

Especially, a cable connector (optical connector) disclosed in the patent document 3 comprises a slide sleeve 26 and a slide cover (connecting ring 30 and 35) which are formed separately. Such a structure is advantageous for improving accuracy of the shape of parts which has a plane pressing a steel ball (sphere 109) strongly to inside, hardness of the plane, and easiness to form the parts. Also, those advantages are important for improving ruggedness and life of a cable connector having functions such as ball baring mechanism and slide mechanism.

FIG. 17 is a sectional and side view of a female plug 10 in a cable connector, which is equivalent to an optical connector disclosed in the patent document 3 and is now used in general. Each sign shown in FIG. 17 is equivalent to those used in the patent document 3 (FIG. 2).

FIG. 18 shows a partial sectional view (enlarged view of a part of FIG. 17) of the female plug 10. An inner slant face 27 and an inner circumference shoulder 28 are formed in a slide sleeve 26, and the inner sidewall plane of the slide sleeve 26 existing between the inner slant face 27 and the inner circumference shoulder 28 presses an steel ball (the sphere 109 in FIGS. 1 and 3 of the patent document 3) to the inside of the male plug.

FIGS. 19A and 19B are a perspective view and a front view of the slide sleeve 26 comprised in the female plug 10. Here the x axis in FIGS. 17 and 18 corresponds to the central axis of the slide sleeve 26 in an approximately cylinder shape. The slide sleeve 26 in the female plug 10 has a groove 26a in a domain of y<0 on a xy plane. This location corresponds to the location of $\theta=-90°$ as shown in the front view FIG. 19B. Here, the angle $\theta$ is an angle from the z axis in a clockwise rotation as in FIG. 19B. Sign A in FIG. 19B represents looking up the xy plane from the downside (z<0).

FIG. 20 is a partial sectional view of the female plug 10 in normal condition seen from the view point A (FIG. 19B). When the female plug 10 is in normal condition, or no external force is applied to the female plug 10, a spring 29 presses the slide sleeve 26 and slide cover (connecting ring 30 and 35) to the left side of the figure. A pin 11a is fixed at the female plug shell (shell 11) by penetrating the cylindrical sidewall of the female plug shell. Such a structure enables to limit range of movement of the spring 29. And by adapting to each of the groove 30a, the groove 26a and the groove 17a, the pin 11a limits relative rotation around the x axis of each part (the connecting ring 30, the slide sleeve 26, and the insulation (insert 17)) so that each part does not rotate relatively.

FIG. 21 is a partial sectional view of the female plug 10 from the view point A when the slide cover (the connecting ring 30 and 35) slides along with the slide sleeve 26 to the right hand (positive direction of the x axis). When the slide cover slides to the right hand, the spring 29 is compressed as shown in FIG. 21 while the steel ball (sphere 109) in the male plug shell 101 becomes to come and go to an engagement groove 16 freely.

Such a slide structure enables to keep connection between the male plug 100 and the female plug 10 securely and make them easier to put on and take off.

Also, the following female plug in an optical connector has been known. The optical connector comprises a detachable adaptor unit having a holding member such as divide sleeve, which keeps a condition that pointed ends of two ferrules face confront and connect with each other. As a prior art about such a female plug in the optical connector, the patent documents 3 and 4 described above have been known.

For example, the optical connector shown in the patent document 3 comprises a detachable adaptor unit having a divide sleeve. So when the pointed end of one ferrule is soiled, this adaptor unit is taken off from the female plug and its soil can be wiped off by using, e.g., a cotton swab.

FIG. 23 is a sectional and side view showing a female plug 10 in a conventional optical connector which is the same as that shown in the patent document 3. Each sign shown in FIG. 23 is equivalent to those used in the patent document 1 (FIG. 11). In FIG. 23, sign 18a represents a male screw formed around the central axis of the press member 18.

Hereinafter, in each figure of the present invention, the direction to which a shell opening of the male plug fitting to the female plug directs is defined as the positive direction of the x axis and each central axis of the male and female plugs corresponds to the x axis.

In a conventional female plug 10 shown in FIG. 23, an end of an adaptor pin 20 has a male screw which screws together with a female screw part 18a. The adaptor pin 20 is free by slackening and uncoupling the screw with a flathead screwdriver. The adapter 19 which contains the divide sleeve 22 can be also separated from a minor diameter part 13 of the shell 11 comprised in the female plug 10 along with the adapter pin 20.

DISCLOSURE OF THE INVENTION

In the above-described conventional arts, however, there remain some problems as follows.

(Problem 1) The slide cover is formed by combining an internal connecting ring 30 and an external connecting ring 35 with each screw part (34 and 36) in the prior arts. That results in increasing one more component, which is not desirable. Moreover, the screws (34 and 36) are likely to be slackened or free, which is not desirable.

(Problem 2) In order to solve the problem 1 sufficiently, additional means such as means (a) and (b) explained below are needed. But ramification may easily be generated even by applying the means (a), (b), and any other means.

(a) Adhesives

When the male screw (inside of the connecting ring) and the female screw (outside of the connecting ring) are adhered at the contacting planes of each screw by using adhesives, the adhesives needs to have smaller surface tension and greater adhesion, which generates cost disadvantage. When rubber adhesives and resin adhesives are employed, problems such as durability toward temperature, air, and ultraviolet rays and product life tend to occur. By employing solder, it becomes difficult to obtain an adhesive area which is large enough to maintain its adhesion. As a result, problems with respect to adhesion tend to be generated.

(b) Welding

On carrying out welding of the male screw (inside of the connecting ring) and the female screw (outside of the connecting ring), problems with respect to welding equipments, man-hour, easiness and safety of operating welding tend to occur.

(Problem 3) Further, in order to decrease fear of the screw (34 and 36) slackening or uncoupling, length of the screw groove (/thread) should be formed longer, which requires rotating the outside (or inside) of the screw a number of times, again and again, so that the male screw and the female screw can be engaged securely. Such a screw requires additional time and work. Accordingly, such an engagement process is inefficient in constructing a device.

(Problem 4) In the conventional cable connector described above, a groove 30a, a groove 26a, a groove 17 a and a pin 11a are used in order to bind four components, or an insert 17 (first contact part), a female plug shell (shell 101), a slide sleeve 26 and inside of a slide cover (connecting ring 30), with each other along with rotation around the axis. But when the pin 11a is fixed on the female plug shell (shell 11), the pin 11a needs to be placed and fixed at a predetermined position on the external wall of the female plug shell 11 after the spring 29 is set pressed by inserting and pushing the female plug shell 11 deeply into the spring 29 which pushes back the slide cover (connecting rings 30 and 35).

FIG. 22 is view illustrating a logical structure for fixing relative rotation of an insulator 112 comprised in the conventional male plug 100 described above and an insulator (insert 17) in the female plug 10 described above. White bands each having long side in lateral direction of the figure represent a constrained component which is constrained relatively rotating around the x axis while its longitudinal direction represents a fixing component for actually binding the relative rotation of each constrained component. For example, relative rotation of the slide sleeve 26 to the female plug shell 11 is carried out by engaging the pin 11a and the groove 26a as shown in FIG. 22. The angle described at the end (the upper end or the lower end) of vertical lines in FIG. 22 corresponds to the angle θ described before, which represents the position where the fixing component is disposed. And length in the r axis direction illustrated at the upper left in FIG. 22 represents a rough distance from the x axis.

For example, by combining a short projection part 32 of inside part of the slide cover (connecting ring 30) and a long guidance groove 107 for inserting the male plug shell 101 at the location where θ=0° in FIG. 22, relative rotation of the slide cover (connecting rings 30 and 35) and the male plug shell 101 is fixed. That can be seen in FIG. 22.

As shown in FIGS. 22, 20 and 21, and also shown in FIGS. 1, 2, and 3 of the patent document 3, in order that the above explained method inhibits relative rotation between an insulator 112 and an insulator 17, the spring 29 is necessarily placed between a ring projection part 14 and the pin 11a comprised in the female plug shell 11. Accordingly, the spring 29 and the pin 11a tend to interfere with each other in constructing process of a device, and such a structural characteristic restricts that the pin 11a cannot be fixed on the female plug shell 11 unless the spring 29 is compressed at least to a condition shown in FIG. 20 and is kept stationary.

For the reasons mentioned above, it is not easy to fix the pin 11a on the female plug shell 11 in the conventional cable connectors (100 and 10).

In order to overcome the aforementioned drawbacks, an engagement method in which the pin 11a is fixed on the female plug shell 11 first, the spring 29 is inserted to the female plug shell through its opening part, and the spring 29 is attached spirally to an interval between the ring projection part 14 and the pin 11a avoiding the portion on which the pin 11a is fixed in advance can be considered.

Setting up the spring 29 in the conventional cable connector, however, requires additional time and work. Moreover, set-up process of such a plug is not simple and that tends to deteriorate efficiency for setting up the cable connector comprising such a plug.

Also, as shown in FIGS. 20 and 21, the pin 11a, which functions as a rotation constraining component for inhibiting relative rotation between each components of the slide cover (connecting ring 30), the female plug shell 11 and the insert 17 (insulator) in the conventional inventions, cannot be easily adjusted and shifted to either leftward or rightward in FIGS. 20 and 21. The reasons are as follows.

(Reason 1) When the pin 11a is shifted to leftward in the figure (e.g., FIGS. 20 and 21), ends of the groove 30a and the groove 26a must be accordingly shifted to the leftward, and therefore each depth of the groove 30a and the groove 26a is further extended to leftward. That results in diluting strength of the connecting ring 30 or the slide sleeve 26, which is not desirable. When a pin hole of the pin 11a is formed too close to the step 15, strength of the female plug shell tends to have problem in its strength around the step 15.

Accordingly, it is almost impossible to shift the pin 11a to leftward in the figure.

(Reason 2) When the pin 11a is shifted to rightward in the figures (FIGS. 20 and 21), the pin 11a needs to combine with the right end of the insert 17 (insulator). When the pin 11a is shifted to further rightward, the maximum diameter part of the pin 11a cannot combine with the insert 17. Accordingly, when the pin 11a is moved to rightward, it becomes difficult to fix rotation of the insert 17 sufficiently. If the insert 17 (insulator) is extended to rightward in the x axis direction in order to avoid such a situation, components of the device and the female plug shell 11 may be designed larger, which is not preferable.

In short, it is difficult to control or move the location of the pin 11a either leftward or rightward in the figure. The pin 11a is, however, placed at a portion which is easily interfered by the spring 29 with each other. Accordingly, as long as the conventional means (the pin 11a) for inhibiting rotation is used in order to inhibit relative rotation of the slide cover (connecting ring 30) to the female plug shell 11, it is not easy to solve problem 4 described above.

(Problem 5)

Further, as long as employing the conventional means (the pin 11a) for inhibiting rotation in order to inhibit relative rotation of the slide cover (connecting ring 30) to the female plug shell 11, the groove 30a shown in FIGS. 20 and 21 must be formed in the connecting ring 30. The groove 30a is, however, not easily formed in a structure (slide cover), in which the connecting rings 30 and 35 shown in FIGS. 20 and 21 are formed combining in one in advance for the reasons as follows.

(Reason 1) In order to form a same groove as the groove 30a in a continuous structure in advance which is formed in an approximately cylindrical shape, the inside of the sidewall of the approximately cylindrical structure must be shaven accurately. For carrying out such a process, a specific equipment or a specific method is required, which may be disadvantageous considering equipments and time for processing.

(Reason 2) Alternatively, a groove may be formed to penetrate the side wall of an approximately cylindrical device (slide cover) in its diameter direction. The groove is extended in the x axis direction and is formed at the same position as that of the groove 30a. And the groove may also be replaced with the above-described groove 30a. Such a structure, however, comprises a hole which is opened at its longitudinal direction, so foreign substances may be inserted from outside into the grooves 30a and 26a shown in FIG. 21. Especially, when a foreign substance is big and stiff, the foreign substance may be pinched between the pin 11a and the spring 29 and the spring 29 loses all of its function. That is not desirable.

Accordingly, as long as the conventional means (the pin 11a) for inhibiting rotation is used in order to inhibit relative rotation of the slide cover (connecting ring 30) to the female plug shell 11, the slide cover must be formed as one structure which can be combined by screwing the connecting ring 30 with the connecting ring 35 as shown in FIG. 17.

Such a structure, however, consequently brings the problems 1-3 described above. So it can never be a preferable structure.

That is, using the conventional means (the pin 11a) for inhibiting rotation in order to prevent relative rotation of the slide cover (connecting ring 30) to the female plug shell 11 can be the largest root cause (defect) for causing the problems 1-4 explained above.

(Problem 6) In the conventional cable connector, the slide cover is screwed. The cross-sectional shape in which screw is formed should be a circular shape. Then, as a matter of course, each cross-sectional shape of the female plug shell, the male plug shell, the slide sleeve and the slide cover must also be an approximately circle. That strongly stricts the shape of the cable connector and also causes undesirable relative rotation around the central axis between each component such as the female plug shell, the male plug shell, the slide sleeve and the slide cover.

Such a relative rotation is not desirable because a first contact part formed at the female plug side and a second contact part at the male plug side have a structure which fundamentally cannot accept relative rotation around the central axis. That is, there is no degree of freedom with respect to relative rotation around the central axis between the first contact part at the female plug side and the second contact part at the male plug part when connecting a cable connector. A means for restricting rotation is always necessary in the conventional cable connector which has a slide cover screwed.

In most of the means for restricting rotation, a groove formed parallel to the central axis is engaged to each convex part of other components with each other so as to prevent rotation. The process related to restricting rotation is one of the most expensive processes (about materials, time and work) for producing a conventional cable connector.

In short, because the cost for designing and processing to restrict rotation is too expensive to be ignored, productivity of a slide cover cannot be freed from the above-described limitations as long as applying a means for forming a slide cover by threaded screwing fixing as disclosed in a conventional invention such as the patent document 3.

Also, the female plug in an optical connector has problems described below.

In the female plug 10 of the conventional optical connector shown in FIG. 23, an adopter pin 20 must be rotated for 7-8 times in order to relax and unscrew an adopter 19. It takes too much time to be expected and that is not desirable.

Further, because a tool such as a screwdriver is needed to unscrew the adopter 19, the facet of the top of ferrule cannot be cleaned without any tool around in case of necessity such as when the optical connector is being used. That is too disadvantageous for operating the optical corrector.

The present invention has been accomplished in order to overcome the aforementioned drawbacks. Thus, an object of the present invention is to produce a connector of high stability and reliability.

Another object of the present invention is to produce a connector of high productivity for its design and producing processes.

Another object of the present invention is to produce a female plug in an optical connector comprising an adopter unit which can be detached very easily in a short time.

Further, another object of the present invention is that a male plug of an optical connector has detachable structure which requires no tool to put on and off an adaptor unit.

Here, each object listed above may be enough to be fulfilled individually by at least one of each means described above, and each invention in the present application is not necessarily secure that there is a solution which solves all the problems at once.

In order to solve the above-described problems, the following means may be effective.

That is, a first aspect of the present invention is a connector having a male plug comprising a male plug shell which is formed in an approximately tube shape and has a steel ball, which is able to rotate and move in radial direction, near its opening part and a female plug comprising a female plug shell which is formed in an approximately tube shape and is connected to said male plug shell and connected to a line which transmits electric power, electric signal, and optical signal comprising: an approximately tube slide sleeve which presses a rotatable steel ball installed around the opening part of the male plug shell from a periphery of the opening part to the centripetal direction; a spring which presses back the slide sleeve along the central axis of the female plug shell until the slide sleeve presses the steel ball to the centripetal direction; and an approximately tube slide cover which comprises a slide sleeve and slides the slide sleeve against elastic force of the spring along the central axis, wherein a first projection part which engages the slide sleeve and a contacting part to which the steel ball can contact while the slide sleeve is pressing the steel ball to the centripetal direction are formed on the surface of the side wall of the female plug shell, the slide cover comprises a second projection part in order to constrain relative rotation of the slide cover and the female plug shell around the central axis, the slide cover can slide to the female plug shell by caulking an approximately ring shape end part of its bottom part placed at the opposite side of its opening part inward, and the slide sleeve engages the first projection part comprised in the female plug shell, the slide sleeve comprises a first concave part which guides the first projection part so that it can slide in the central axis direction and a second concave part which guides the second projection part so that it can slide in the central axis direction.

As a result, when the slide sleeve presses the steel ball to the centripetal direction, separation of the female plug shell and the male plug shell can be prevented by reaction force generated between the steel ball and the contacting part.

As shown in FIGS. 17, 18, 20, 21 and 22, conventionally a connecting ring 30 and a connecting ring 35 were formed as one unit by screwing together (34 and 36) in order to form a slide cover. In the present invention, however, the end part of the slide cover is formed by caulking, and that enables to form the slide cover by using one member from the beginning. By applying the present invention, a possibility that the screw is loosed or unscrewed as in the conventional device can be completely excluded.

Accordingly, the problems 1-3 listed above can be consequently solved. As a result, the present invention can produce a cable connector having more excellent durability and reliability more easily and effectively compared with the conventional one.

Further, because caulking is a technique employed to remarkably large field such that it can be applied to the end part of the slide cover formed in an approximately tube shape and has an arbitrary sectional shape, the sectional shape of approximately tube components such as a slide cover, both male and female shells and a slide sleeve can be selected (designed).

A second aspect of the present invention is a connector according to the first aspect, wherein the slide sleeve is formed in an approximately ring shape which comprises a large ring part of an approximately band shape and a small ring part of an approximately band shape having relatively smaller aperture and sharing the axis with the large ring part, wherein the slide sleeve is formed to have two-step ring structure whose cross-section vertical to the axis direction is approximately two steps, the first concave part is formed at the small ring part side of the slide sleeve so that its opening part faces the bottom of the slide sleeve, and the second concave part is formed at the large ring part side of the slide sleeve so that its opening part faces the opening part of the slide cover.

By employing such structure, characteristic described above can be excellently carried out and the problem 4 may be solved easily. Details of this structure are explained below.

A third aspect of the present invention is a female plug which comprises an approximately tube female plug shell connected to an approximately tube male plug shell, which has a rotatable steel ball which is installed around the opening part and can be shifted in the radial direction, comprising: an approximately tube slide sleeve which presses a rotatable steel ball installed around the opening part of the male plug shell from a periphery of the opening part to the centripetal direction; a spring which presses back the slide sleeve along the central axis of the female plug shell until the slide sleeve presses the steel ball to the centripetal direction; and an approximately tube slide cover which comprises a slide sleeve and slides the slide sleeve against elastic force of the spring along the central axis, wherein a first projection part which engages the slide sleeve and a contacting part to which the steel ball can contact while the slide sleeve is pressing the steel ball to the centripetal direction are formed on the surface of the side wall of the female plug shell, the slide cover comprises a second projection part in order to constrain relative rotation of the slide cover and the female plug shell around the central axis, the slide cover can slide to the female plug shell by caulking an approximately ring shape end part of its bottom part placed at the opposite side of its opening part inward, and the slide sleeve engages the first projection part comprised in the female plug shell, the slide sleeve comprises a first concave part which guides the first projection part so that it can slide in the central axis direction and a second concave part which guides the second projection part so that it can slide in the central axis direction.

A fourth aspect of the present invention is a female plug according to the third aspect, wherein the slide sleeve is formed in an approximately ring shape which comprises a large ring part of an approximately band shape and a small ring part of an approximately band shape having relatively smaller aperture and sharing the axis with the large ring part, wherein the slide sleeve is formed to have two-step ring structure whose cross-section vertical to the axis direction is approximately two steps, the first concave part is formed at the small ring part side of the slide sleeve so that its opening part faces the bottom of the slide sleeve, and the second concave part is formed at the large ring part side of the slide sleeve so that its opening part faces the opening part of the slide cover.

In all the means described above, each component which is formed in an approximately tube shape may alternately formed in an approximately cylinder shape.

A cylinder is the easiest shape to form and a representative shape in tubes. A cylinder is the advantageous shape with enough strength and is also advantageous for miniaturizing. Further, by forming in a cylinder shape, conventional connector components (e.g., the first and the second contact parts) can be employed without modification, which is preferable. Accordingly, by forming each tube component in a cylinder shape, the present invention can produce a cable connector having more excellent durability and reliability more easily and effectively compared with the conventional one with taking its advantages.

By employing such structure, a rotation constraining means which inhibits relative rotation between the slide cover and the female plug shell 11 can be obtained even when the long pin 11*a* is not maintained in the radial direction as shown in FIGS. 20 and 21 in order to inhibit relative rotation between the insulator (insert 17) and the female plug shell 11. In short, it becomes unnecessary to use the pin 11*a* which inhibits relative rotation between the insulator (insert 17) and the female plug shell and directly constrain rotation of the slide cover. As a result, the pin 11*a* can be formed shorter than that in a conventional device, and the pin 11*a* and the spring 29 never interfere with each other while composing the device.

Accordingly, the problem 4 can be solved.

The above-described effect is explained in detail in reference to figures such as FIG. 6 in the following first embodiment. By employing that structure, two-step process of rotation constraining means which inhibits relative rotation between the slide cover 215 and the female plug shell 202 via the slide sleeve 203 as shown in FIG. 6 can be applied, which enables the spring to expand and contract freely without contacting to the pin. In other words, interference between rotation constraining means which inhibits relative rotation between the slide cover 215 and the female plug shell 202 (the pins 204 and 205 in FIG. 6) and the spring (the coil spring 213 in FIG. 6) may be easily avoided even while constructing the pins and the coil spring. As a result, the above-described problem 4 can be solved.

A fifth aspect of the present invention is to form a second projection part at the slide cover which constrains relative rotation between the slide cover and the female plug shell around the central axis.

Here, the second projection part does not necessarily mean that there is a "first projection part." The second projection part may exist regardless of the existence of a first projection part. That is, a means in the fifth embodiment is also useful for a cable connector without a first projection part.

A sixth aspect of the present invention is a slide sleeve according to the fifth aspect comprising a first concave part which engages the first projection part in the female plug shell and guides the first projection part so that it can slide in the central axis direction, and a second concave part which engages the second projection part and guides the second projection part so that it can slide in the central axis direction.

Here, the rotation constraining means described above may not necessarily have two-step structure through the slide sleeve 203. According to the sixth aspect of the present invention, rotation constraining means can be designed effectively as explained in the second embodiment. Accordingly, interference between the pins and the spring can be avoided, and that proves the problem 4 described above.

A seventh aspect of the present invention is, according to the fifth aspect, to form the second concave part, which combines with the second projection part and guides the second projection part so that it can shift in the central axis direction, at the female plug shell.

By employing such structure, for example, the fifth aspect can also be carried out. This is explained in the second embodiment. According to such structure, the problem 4 can be easily solved and at the same time the slide sleeve can be formed in a simpler shape, which is very advantageous.

An eighth aspect of the present invention is that each tube component has a sectional shape vertical to the central axis formed in a plane approximately similar to each other and that the plane is always asymmetric with respect to rotation of an arbitrary angle θ ($\forall \theta \neq 2 m\pi$; m is an arbitrary integer number) around an arbitrary point in its perimeter.

As a result, relative rotation of each component such as both the female and male shells, the slide cover, and the slide sleeve can be necessarily constrained, which makes it easier to design and produce a cable connector.

A ninth aspect of the present invention is a female plug of an optical connector comprising an adaptor unit being able to be attached or detached having a holding member which holds the facet of the pointed end of the ferrule to contact to each other, wherein bayonet is used to form an attachable and detachable structure of the adaptor unit.

FIG. 10 is a perspective view illustrating operation of a bayonet lock. By using such a bayonet lock, for example, it can be unlocked or locked only by rotating about one right angle (90°) in general.

More generally, the engaging pin (convex part 224a') formed at a male side of a lock (224') may be plural number. A rotation angle of locking or unlocking the lock is determined by a shape of the bayonet lock groove H' formed at the female side (226') of the lock. In considering easiness for using and producing the bayonet lock, rotation angle for locking and unlocking may preferably about 60° to 120° when two engaging pin (convex part 224a') are formed at the male side of the lock. When only one engaging pin is formed as shown in FIG. 10, the rotation angle for locking and unlocking may preferably about 60° to 180°.

According to the present invention, locking and unlocking can be carried out by operating in only two right angles of rotation. Further, by using a bayonet lock, it can be securely locked without firmly screwing both of the male and female components. Consequently, according to the present invention, locking and unlocking can be easily carried out.

In short, as disclosed in the present invention, a female plug of an optical connector comprising an attachable and detachable adaptor unit which can be attached and detached easily in remarkably a short time can be obtained when the attachable and detachable structure of the adaptor unit employs a bayonet lock.

According to this structure, it becomes possible and easier to obtain an adaptor unit which requires no tool to attach and detach.

A more preferable structure is explained in concrete hereinafter.

That is, a tenth aspect of the present invention is that an approximately tube shape female plug shell is formed including the female plug described above.

The present invention can achieve the effect described above even when an approximately tube shape female plug shell is not formed in the female plug. However, in order to maintain conjunction between the female plug and the male plug securely, keep the end facet of the ferrule as clean as possible, sufficiently protect the optical connector from external force, and sufficiently keep waterproofing of connector components, the female plug in the present invention may be preferably included in the female plug shell. Accordingly, the present invention multiplies larger actions and effects (added value) to an optical connector with larger reliability.

An eleventh aspect of the present invention is to form a shaft (hereinafter referred to "adaptor shaft") which conveys rotational operation to lock and unlock the bayonet lock in the adaptor unit.

According to this structure, the shaft which conveys rotational operation to lock and unlock the bayonet lock is separated at the same time when the adaptor unit is separated. That is very useful because the shaft does not interfere with cleaning the end of the ferrule.

A twelfth aspect of the present invention is to form a hook bolt at the female plug from which the adaptor unit is separated, wherein the hook bolt comprises a bayonet lock groove which sufficiently engages to the end A of the adaptor shaft formed at the opposite side to the male plug.

The hook bolt having such a bayonet lock groove (e.g., FIG. 14) embodies the female screw structure in a bayonet lock. So this hook bolt can be applied to form the end portion A of the shaft. The female screw structure of a bayonet lock, however, is useful to design the female plug having easier structure to construct when the female screw is installed at the main body side of the female plug rather than the adaptor unit side. That is because the hook bolt literally functions as a bolt as clearly explained in the following embodiments (FIGS. 12, 13 and 14).

A thirteenth aspect of the present invention is that two convex parts each of which is approximately orthogonal to the shaft are formed at the end portion A and that at least one portion of the engaging groove which is to be engaged to a flathead screwdriver is formed at the hook bolt by using a portion of the bayonet lock groove.

For example, the hook bolt shown in the embodiment below (FIG. 14) has such an engaging groove. That makes it possible or easier to use a flathead screwdriver to screw up the hook bolt, and the main body of the female plug becomes easier to construct.

A fourteenth aspect of the present invention is to arrange the end part B, which is placed at the male plug side of the shaft, at approximately center of the end portion of the female plug. By arranging the end part B at the end portion of the female plug, it becomes easier to attach and detach the adaptor unit. Further, by arranging the end part B at the center of the end portion of the female plug, strength tends to apply toward the center of gravity of the female plug when the end part B is pressed to lock and unlock the bayonet lock, which enables to keep operational stability of the device.

Especially, when the female plug is comprised in the female plug shell, generally the adaptor unit is arranged at slightly deeper side of the opening part of the female plug shell. This is to protect the adaptor unit sufficiently with the female plug shell. And by arranging the end part B placed at the male plug side of the shaft at approximately the, center of the end portion of the female plug, it becomes convenient to insert fingers to the deeper portion of the opening part of the female plug and operate the end portion B by pressing, pinching and rotating with fingers to attach and detach the adaptor unit.

A fifteenth aspect of the present invention is to form a spring which extends when unlocking the bayonet lock and presses forward the end part B placed at the male plug side of the shaft to the approximately end part of the female plug, and to separate the adaptor unit from the female plug by further pulling the end part B which is pressed by the spring to the same direction, or the forward direction of the end portion of the female plug.

If a shaft is comprised in the adaptor unit when adaptor unit is pulled out after unlocking the bayonet lock, the adaptor unit can be separated along with the adaptor shaft by pulling the end part B. So if the end part B sticks out it is easier to pinch the end part B to pull out. That makes it remarkably easier to separate the adaptor unit, which is very desirable.

Also, the spring part can be pinched with fingers, which is convenient for pulling out the adaptor unit.

A sixteenth aspect of the present invention is to form a fingertip operation part which is formed around the end portion B arranged at the male plug side of the shaft in order to lock and unlock the bayonet lock or to pull out the adaptor unit.

Such fingertip operation part makes it easier to operate the end portion B by using fingertips, and it may be preferably formed according to the following processes.

That is, a seventeenth aspect of the present invention is that the fingertip operation part comprises an o-ring, a cap, and a knob made of materials such as rubber and resin.

Owing to such a structure, fingers hardly slip while pushing, screwing and pressing against to screw the end portion B, and it becomes easy to hold the end portion B with fingers and further fingers do not ache even by operating the end portion B again and again.

An eighteenth aspect of the present invention is that the fingertip operation part comprises an approximately butterfly-like head which makes it possible or easier to screw or loose only by using finger tips.

Here the butterfly-like head is a head which is easy to hold by fingertips and is easy to apply force to rotate like a head of well-known butterfly nut and butterfly screw as shown in FIG. 24.

According to such structure, the fingertip operation part described above can be formed in a shape with more excellent operationality.

A nineteenth aspect of the present invention is that the bayonet lock groove which is to be formed at the female side of the bayonet lock structure comprises a first guide groove which guides the convex part placed at the male side of the bayonet lock in the central axis direction along the detaching direction and a second guide groove which guides the convex part at the male side to rotational direction around the central axis and that an approximately cylindrical round groove, at which the central axis is approximately orthogonal to the axis, is formed at the end part of the second guide groove.

Such round groove is preferable to improve to hold the convex part formed at the male side of the lock, and functions to maintain combination of the lock stably. Especially, because the male side of the lock is pressed owing to elastic force of the spring which presses out the end part B in forward direction of the female plug end, the convex part at the male side of the lock is pressed to the round groove. Consequently, unless the operation to compress the spring such as unlocking operation is carried out, the convex part at the male side of the lock cannot shift from that position.

Through employment of the aforementioned aspects of the present invention, the aforementioned drawbacks can be overcome effectively and rationally.

BRIEF DESCRIPTION OF THE DRAWINGS

FIG. 10 is a perspective view illustrating operation of a bayonet lock.

FIGS. 15A and 15B are a front view and a sectional view of an adaptor unit U.

FIG. 16 is a sectional side view of the female plug 200 in an optical connector from which the adaptor unit U is separated.

BEST MORE FOR CARRYING OUT THE INVENTION

Embodiments of the present invention will next be described based on concrete examples. The scope of the present invention, however, is not limited to the embodiment described below.

First Embodiment

Figure 1:
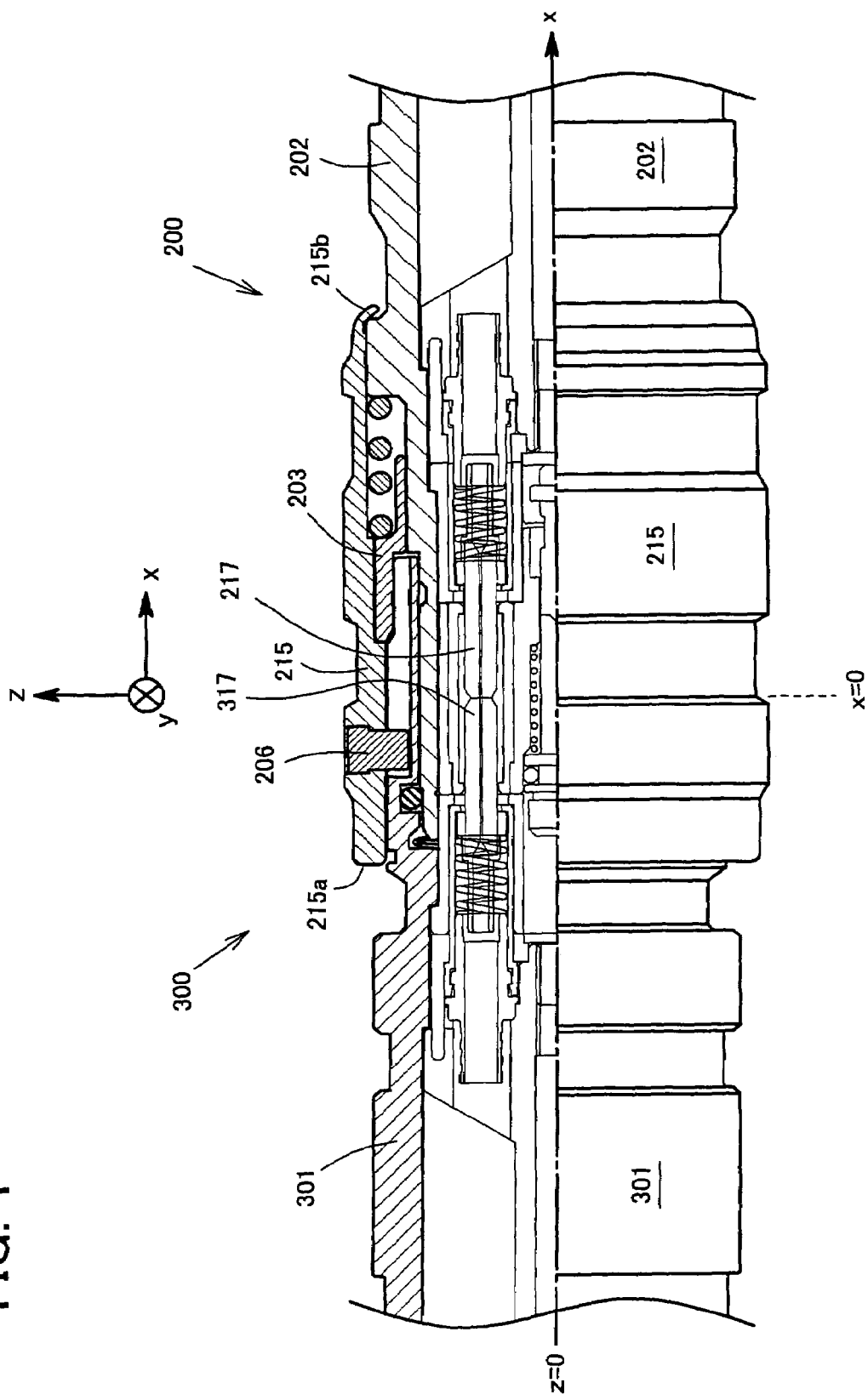
FIG. 1 is a sectional view showing combination of a male plug 300 and a female plug 200 according to a first embodiment of the present invention.

FIG. 1 is a sectional side view when a male plug 300 and a female plug 200 are combined in the first embodiment. This cable connector has a male plug shell 301, a female plug shell 202 and a slide cover 215 each of which is formed in an approximately cylindrical shape and is exposed at the external portion of the cable connector.

The slide cover 215 comprises a slide sleeve 203 which is formed in an approximately cylindrical shape and is fixed on the female plug shell 202 so that the slide sleeve 203 can slide in the x axis direction.

The central axis of the approximately cylindrical components described above corresponds to the x axis. X coordinate of the standard position of a plane at which two ferrules are contacting is represented by x=0. As shown in FIG. 1, a pin 206 is placed on the x-z plane. A rotation angle around the x axis is represented by θ hereinafter. The positive rotational angle θ (θ>0) is measured from the positive direction of the z axis (θ=0) to the positive direction of the y axis, and the negative rotational angle θ (θ<0) is measured from the positive direction of the z axis to the negative direction of the y axis.

An opening part 215a of the slide cover 215 is directed to the negative direction of the x axis, while the end portion 215b placed at the bottom side of the slide cover 215 is in the positive direction of the x axis.

Figure 2A:
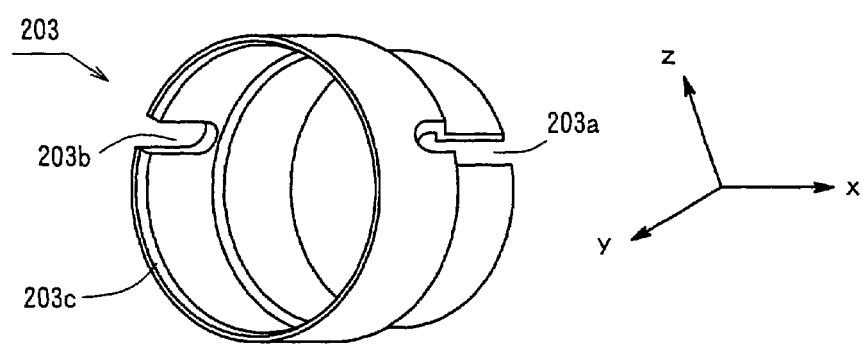
FIGS. 2A, 2B, and 2C are a perspective view, a front view, and a sectional view of a slide sleeve 203 in the female plug 200.
Figure 2B:
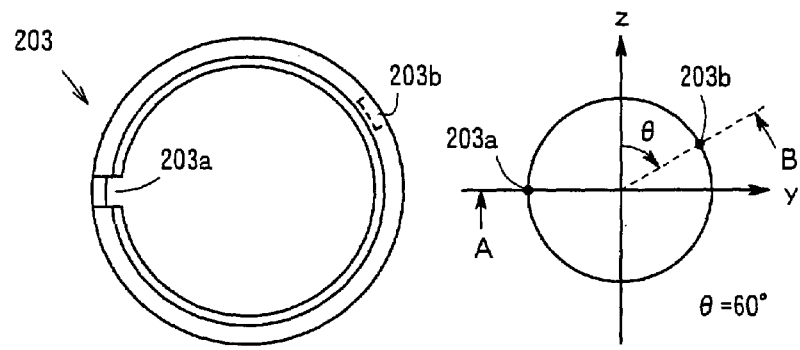
Figure 2C:
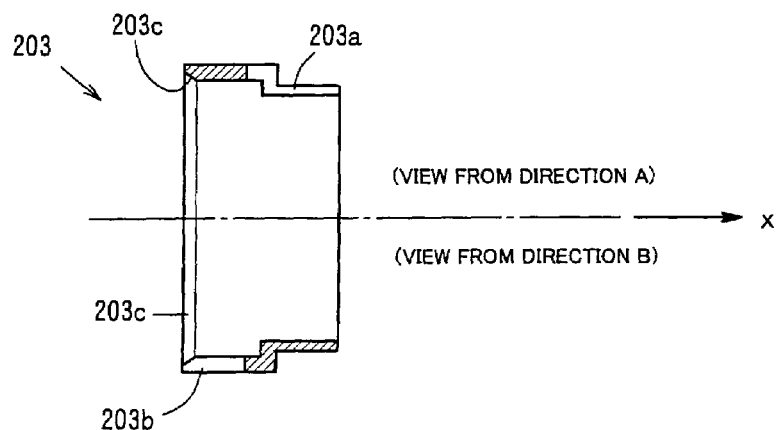

FIGS. 2A-2C are a perspective view (FIG. 2A), a front view (FIG. 2B) and a sectional view (FIG. 2C) of the slide sleeve 203 comprised in the female plug 200. The slide sleeve 203 has a groove 203a (first concave part) which combines with a first projection part (pin 204 in FIG. 5B) formed in the female plug shell 202 and enables guide the first projection part (pin 204) to slide in the x axis direction. Further, the slide sleeve 203 has a groove 203b (second concave part) which combines with a second projection part (pin 205 in FIG. 3) formed in the slide cover 215 and enables to guide the second projection part to slide in the x axis direction. The grooves 203a and 203b are formed to constrain relative rotation between the slide cover 215 and the female plug shell 202 around the x axis. Because guiding relationship between the grooves and the pins are relative to each combining component, it may be alternatively interrupted that the pins may guide the grooves. It may be needless to say that such interruption is always relative with each other.

The slide sleeve 203 shown in FIGS. 2A-2C is formed in an approximately ring shape which comprises a large ring of an approximately band shape and a small ring of an approximately band shape. The small ring has relatively smaller aperture and shares the axis with the large ring. By combining the large and small rings with each other, two-step ring structure is obtained. The groove 203a (the first concave part) faces to the end part 215b of the bottom of the slide sleeve 215 and is formed so that its opening part faces to the small ring part side in the slide sleeve 203, while the groove 203b (the second concave part) is installed at the large ring side of the slide sleeve 203 so that its opening part faces the opening part 215a of the slide cover 215.

At the opening part of the slide sleeve 203 which opens in the side where the large ring is placed and faces to the opening part 215a side (the negative direction of the x axis) of the slide cover 215, an inclining plane 203c is formed at inside of the large ring. The groove 203b (the second concave part) is formed so as to cut off a portion of the inclining plane 203 and formed so that it is opened to the male plug 300 side. As shown in FIG. 2B, the groove 203b is placed at the location of θ=60°.

Figure 3:
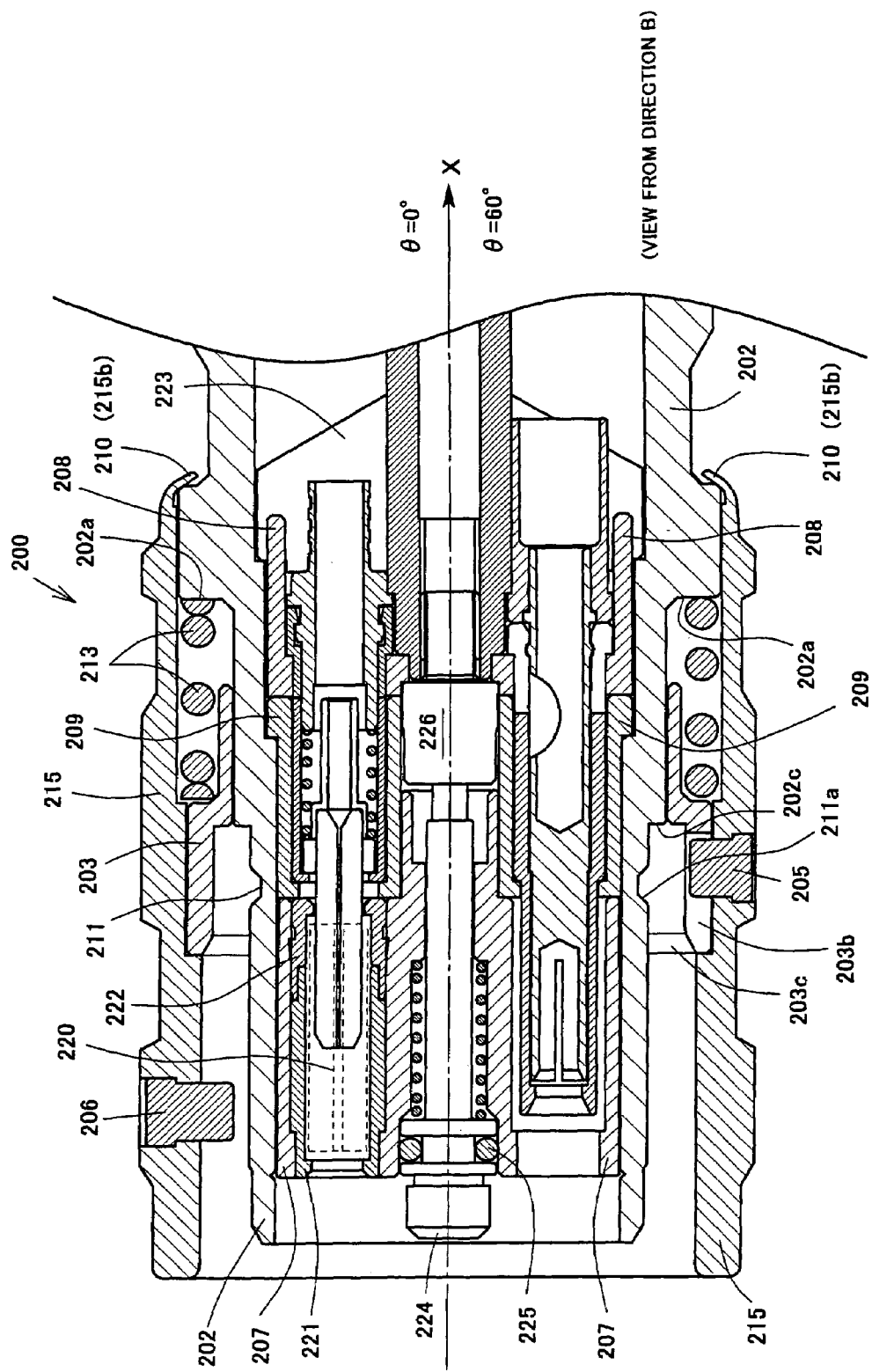
FIG. 3 is a sectional view of the female plug 200.

FIG. 3 is a sectional view of the female plug 200. In FIG. 3, the upper portion from the x axis representing the central line illustrates a sectional view of the female plug 200 where θ=0°, and the portion below the x axis illustrates a sectional view where θ=60° seen from the view point B in FIG. 2B.

A coil spring is sandwiched between a coil spring containing wall 202a of the female plug shell 202 and the edge of the large ring of the slide sleeve 203 and is held inside of the slide cover 215 in which the coil spring 213 can expand and contract freely. Sliding of the slide cover 215 in the positive direction of the x axis is restricted by the coil spring 213, or by means that the slide sleeve 203 is contacted with the coil spring contacting wall 202a, and sliding in the negative direction of the x axis is restricted by a caulking 210. The caulking 210 caulks its bottom part, or the end part 215b which is placed at the opposite side of the opening part of the slide cover 215, to inside of the female plug 200.

By forming the caulking 210 in the female plug 200, the cable connector of the present invention can overcome the problems 1-3 described above.

Figures 5A, 5B:
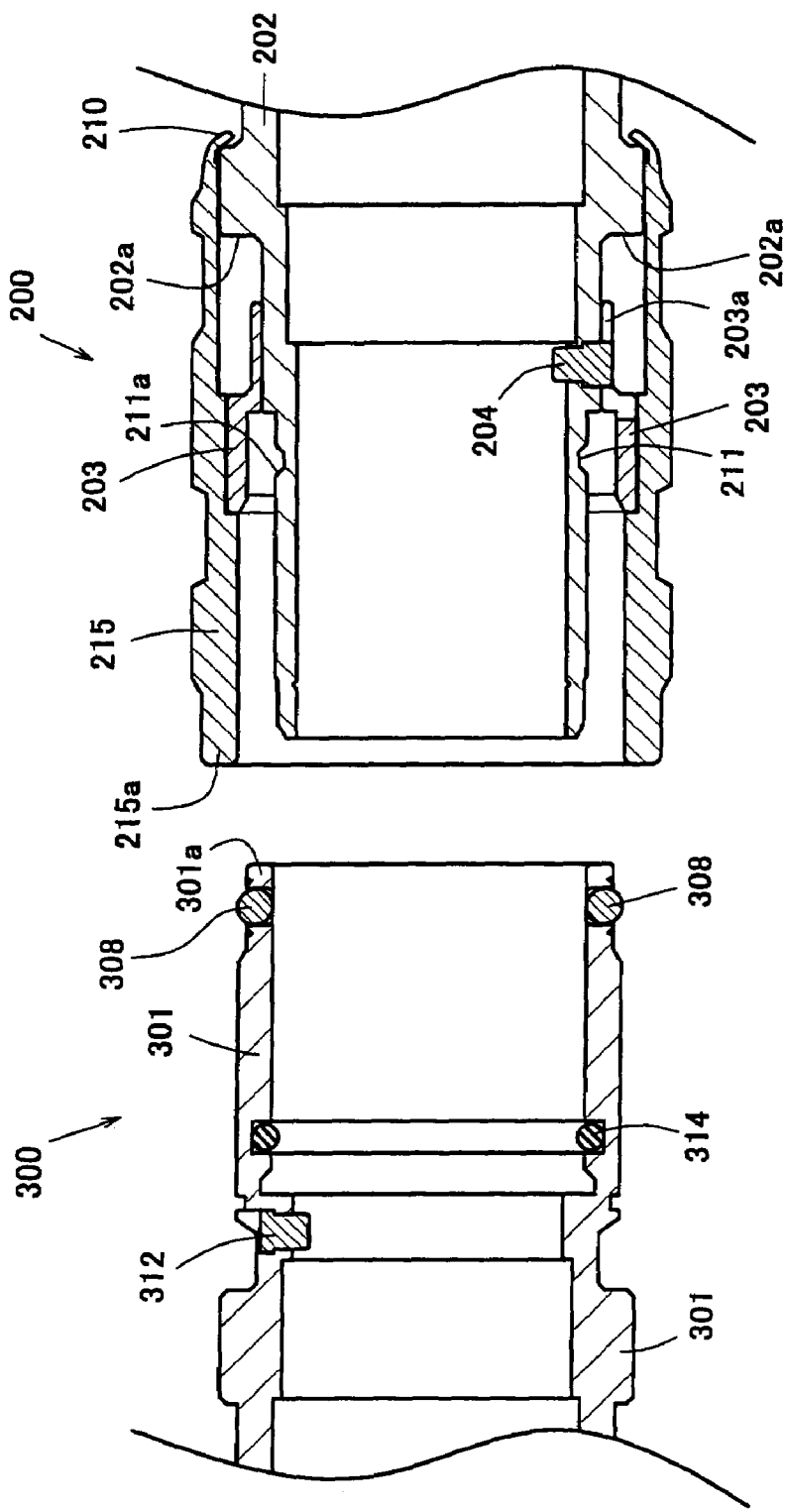
FIGS. 5A and 5B are sectional views of the x-y plane of the male plug 300 and the female plug 200.

The pin 205 forms the second projection part which engages the groove 203b (the second concave part) of the slide sleeve 203. A steel ball engaging groove 211 formed on the female plug shell 202 as shown in FIGS. 5A-5B is enaged with a steel ball 308 which is placed around the opening part 301a of the male plug 301 in FIGS. 5A-5B. The steel ball engaging groove 211 has a contacting part 211a which is contacted with the steel ball 308. The contacting part 211a formed on the female plug 202 functions to restrict movement of the steel ball 308 in the negative direction of the x axis.

Movement of the male plug shell 301 comprising the steel ball 308 in the positive direction of the x axis may be constrained (restricted) by the steel ball engaging groove 211, and alternatively, it may be restricted by the facing wall 202c of the pointed end of the male plug shell placed on the female plug shell 202.

A first contact part placed at the female plug 200 side comprises an insulator 207, an insulator 208, an insulator 209, and components comprised in those insulators. Each of the insulator 207, the insulator 208 and the insulator 209 has engaging part which inhibits relative rotation around the x axis and is abbreviated to be shown around the figures. A divide sleeve 220 is held by a divide sleeve holder 221 and a divide sleeve holder 222. In the divide sleeve 220, a ferrule 217 contacts with a ferrule 317 which is comprised in the second contact part at the male plug 300 side as shown in FIG. 1 at their ends with each other as shown in FIG. 4.

Signs 223, 224, 225, and 226 represent a TM clamp, an adaptor shaft, an o-ring, and a hook bolt, respectively.

Figure 4:
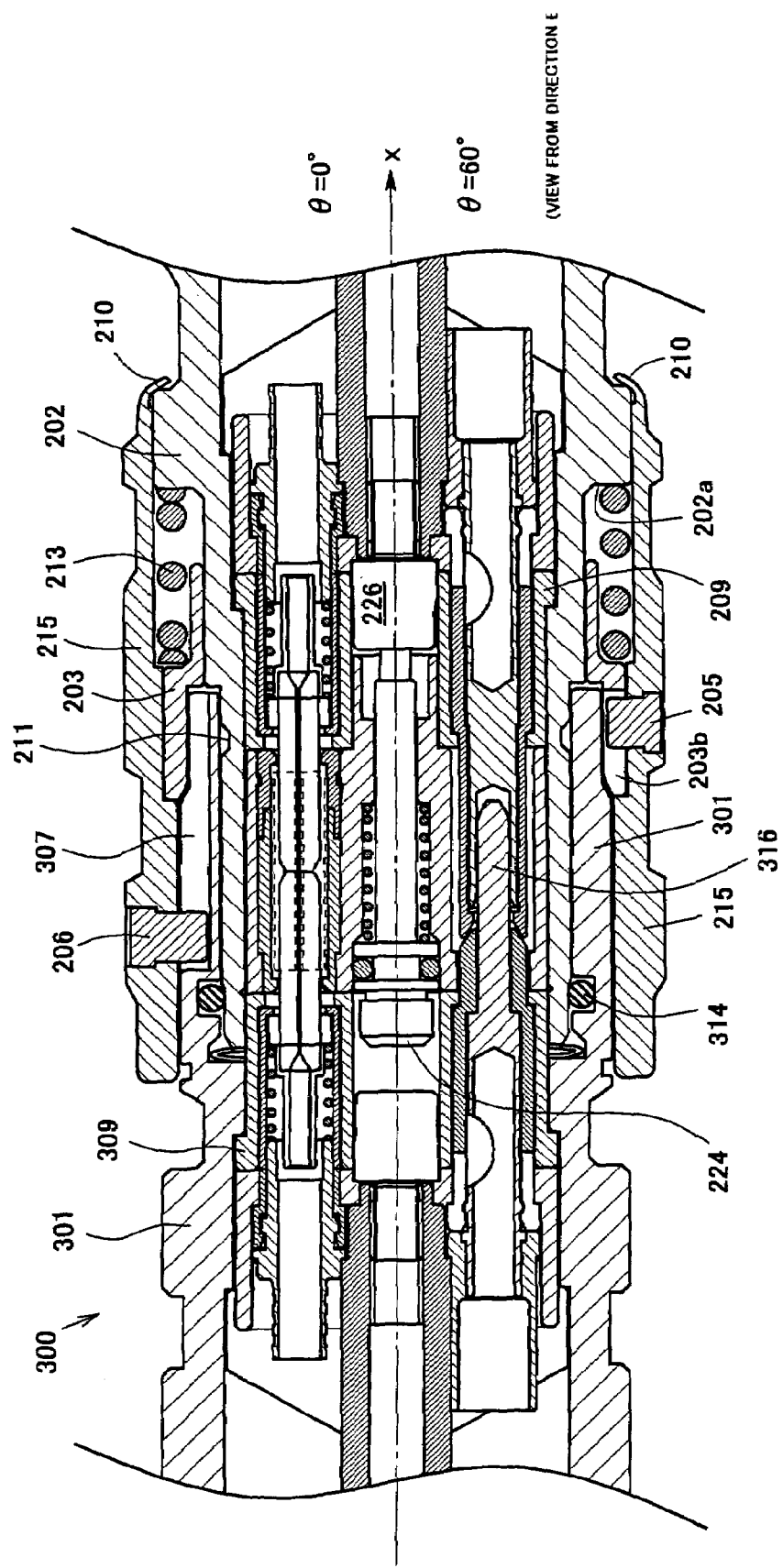
FIG. 4 is a sectional view showing combination of the male plug 300 and the female plug 200.

FIG. 4 is a sectional view when the male plug 300 and the female plug 200 are coupled.

The guide groove 307 formed along the x axis from the end of the male plug shell 301 guides a pin 206 when the male and female plugs are coupled. Because the steel ball 308 does not exist at the sectional plane, the steel ball 308 engaging to the steel ball engaging groove 211 is not shown in FIG. 4. However, the steel balls 308 are 6 in total, and each of the steel balls is disposed at the position as shown in FIG. 5A which satisfies the following equation (1):

[Equation 1]

$$\theta = \pm(30° + 60° \times n) \quad (n=0, 1, 2) \qquad (1)$$

The o-ring 314 shown in FIG. 4 functions to maintain closeness of coupling the male and female plugs. The sign 316 represents an electric plug pin formed in the second contact part at the male plug 300 side.

FIGS. 5A-5B are sectional views of the male plug 300 and the female plug 200 at x-y plane seen from above (z>0), respectively. That is, the upper side part of the central axis in FIGS. 5A-5B is placed where $\theta=90°$, and the downside part of the central axis is placed where $\theta=-90°$. Details of the first contact part at the female plug side and the second contact part at the male plug side are already illustrated in FIG. 4, so they are abbreviated to be shown in FIGS. 5A-5B.

The steel ball 308 which is disposed around the opening part 301a of the male plug shell 301 can be shifted slightly to the radial direction of the opening part 301a. When the slide sleeve 203 slides to the rightward (the positive direction of the x axis) sufficiently, the steel ball 308 can be engaged with the steel ball engaging groove 211 on the female plug shell 202 by coupling both of the male and female plugs. And when the slide cover 215 and the slide sleeve 203 shift back to the initial position owing to elastic force of the coil spring 213 shown in FIG. 4, the steel ball 308 is pressed by the slide sleeve 203, the steel ball 308 receives reaction force from the contacting part 211a of the steel ball engaging groove 211, which prevents the steel ball 308 from moving to the negative direction of the x axis. As a result, the male and female plugs may not be separated while the steel ball 308 is pressed by the slide sleeve 203.

Figure 21:
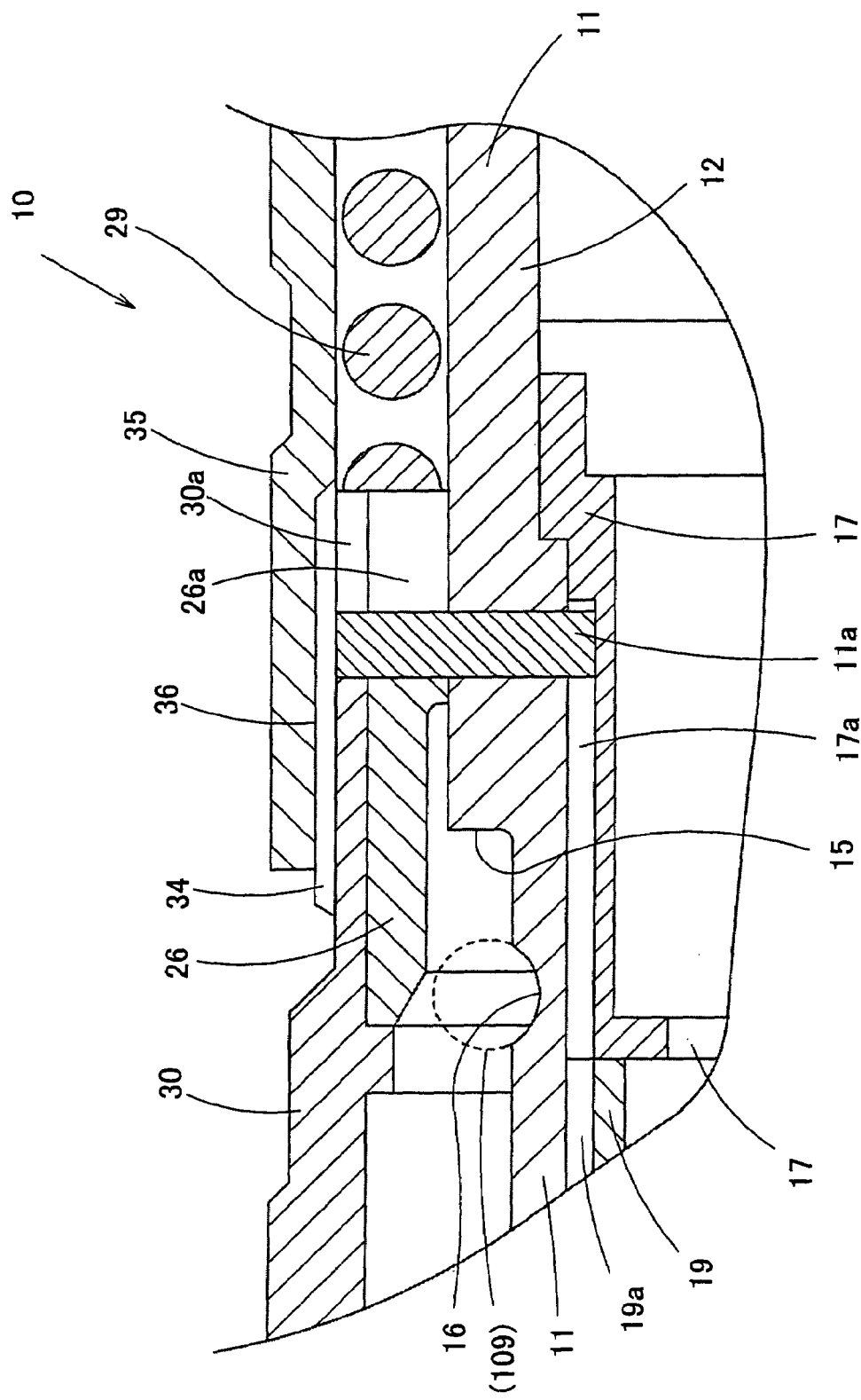
FIG. 21 is a partial sectional view (in sliding(??) condition) of the conventional female plug 10 seen from the direction A.
Figure 22:
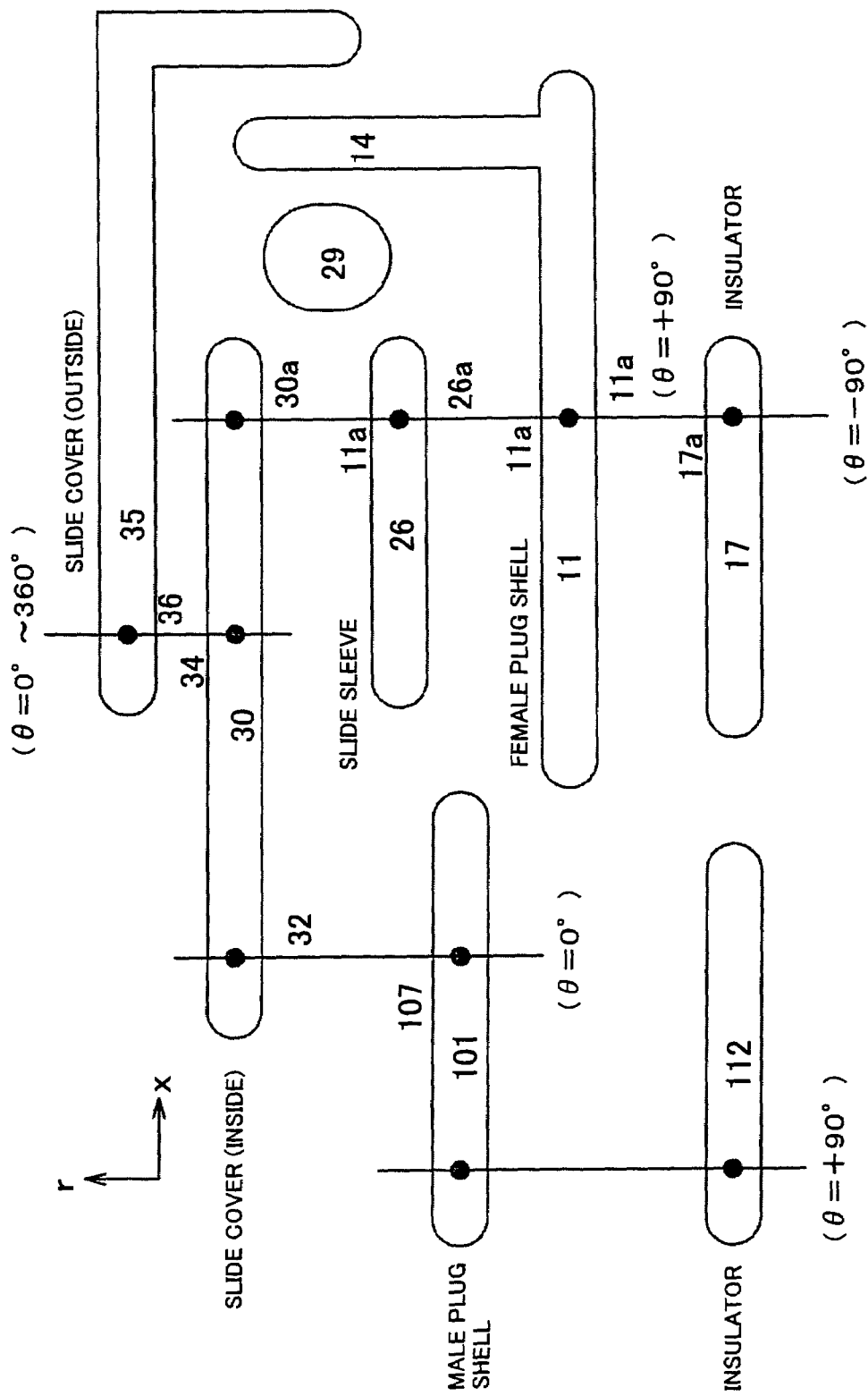
FIG. 22 is a logical view illustrating the structure for biding relative rotation of an insulator 112 in a conventional male plug 100 and an insulator 17 in the conventional female plug 10.
Figure 23:
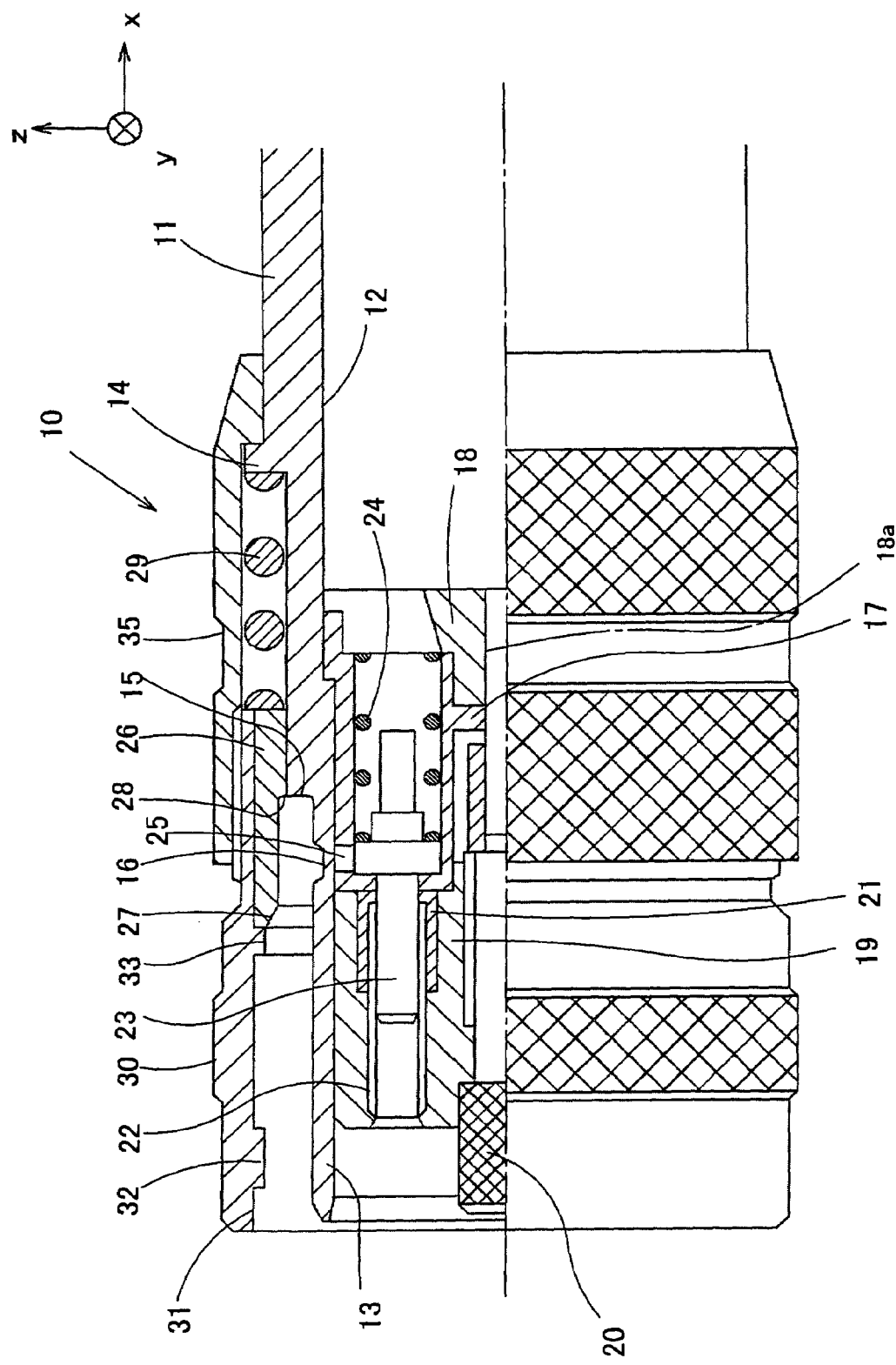
FIG. 23 is a side and sectional view of the female plug 10 of a conventional optical connector.

The pin 204 (first projection part) functions to restrict relative rotation of the insulator 209 shown in FIG. 4 around the x axis to the female plug shell 202, and the pin 312 functions to restrict relative rotation of the insulator 309 shown in FIG. 4 around the x axis to the male plug shell 301. Each of the insulator 209 and the insulator 309 has a groove (means for restricting rotation) which is approximately equivalent to the groove 17a formed in the insert 17 as illustrated in FIG. 21.

Figure 6:
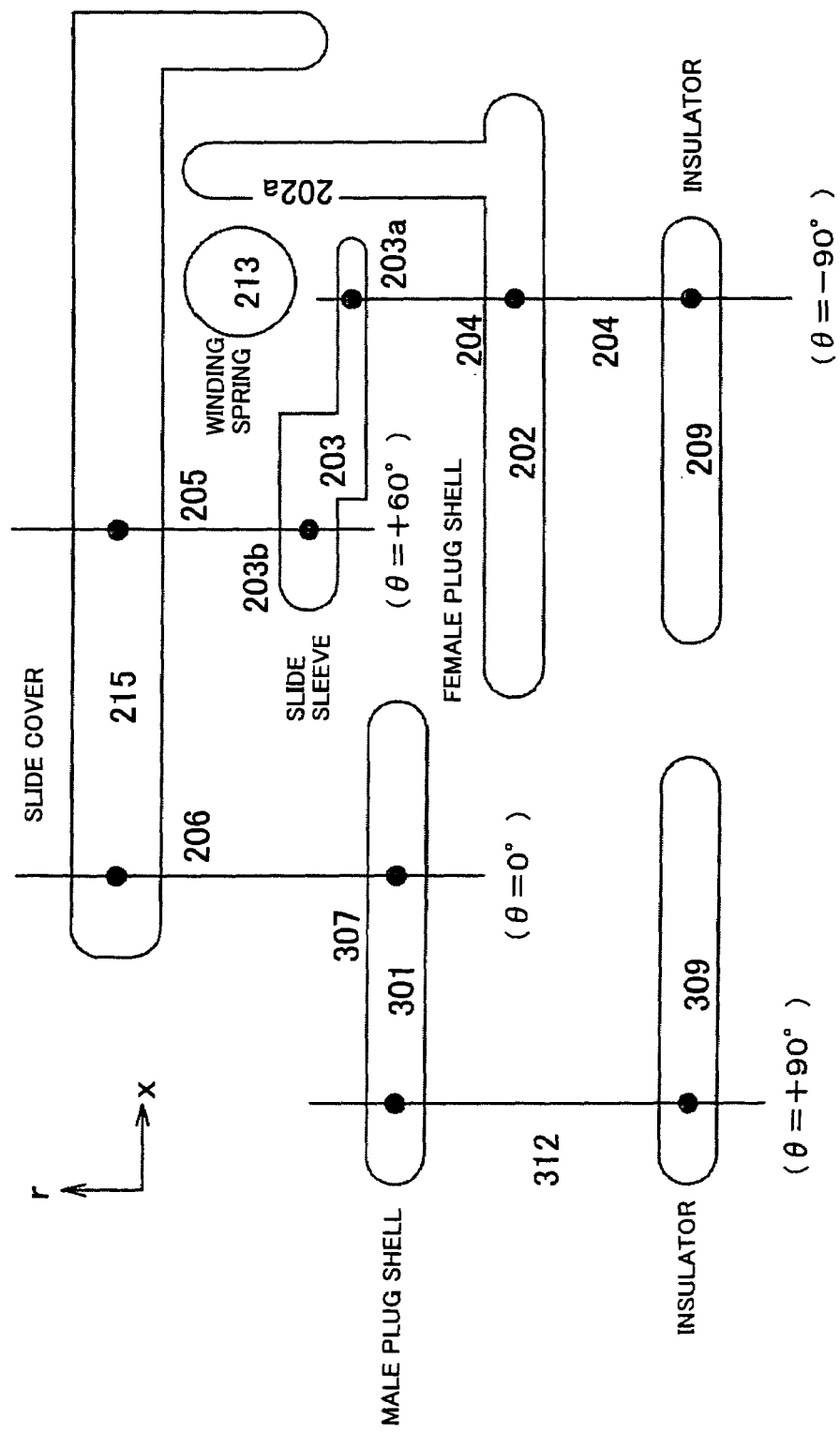
FIG. 6 is a logical view illustrating the structure for binding relative rotation of an insulator 309 and an insulator 209 (first embodiment).

FIG. 6 is a logical view illustrating the structure for binding relative rotation of the insulator 309 and the insulator 209 in the first embodiment. Each white band having its longitudinal direction in the lateral direction of FIG. 6 represents a restricted body whose relative rotation around the x axis is to be restricted, and each longitudinal line represents a binding member for constraining relative rotation between each of the restricted body. For example, relative rotation of the slide sleeve 203 to the slide cover 215 is restricted by engaging the pin 205 (the second projection part) with the groove 203b (the second concave part) as shown in FIG. 6. The angle $\theta$ shows a position where the binding member is placed. Length in the r axis of coordinates direction illustrates distance of each component from the x axis.

By applying such a structure, as shown in FIGS. 4, 5A-5B and 6, a binding member for binding relative rotation between the slide cover 215 and the female plug shell 202 can be formed by two-step structure through the slide sleeve 203. Because the pin 204 does not stick out from the small ring in the slide sleeve 203 as shown in FIG. 5B, the coil spring 213 passes above the small ring (at the far side from the x axis) of the slide sleeve 203 as shown in FIG. 4 without contacting to the pin 204 and can expand and contract freely on the pin 204. As a result, the location of the coil spring 213 cannot be restricted by the pin 204.

Thus, according to the first embodiment, a rotation constraining means (the pins 204 and 205) which inhibits relative rotation between the slide cover 215 and the female plug shell 202 and a spring (the coil spring 213) can be set up with no interference, so the pin can be fixed without pressing the spring and the spring can be placed at an initial position without twisting it spirally.

In fact, by setting up each component in the female plug 200 side according to the process described below, interference to be occurred during setting up the pins 204, 205 and the coil spring 213 can be easily avoided.

(Process 1) The first contact part comprising the insulator 209 is inserted and fixed in the female plug shell 202. At this time, a groove which is formed on the insulator 209 and is not shown in figures and the pin 204 should be carefully engaged (positioned) in order that rotation of the insulator 209 in the female plug shell 202 around the x axis is constrained by the pin 204.

(Process 2) The slide sleeve 203 is inserted into the slide cover 215. At this time, a groove 203b and the pin 205 should be carefully engaged in order that rotation of the slide sleeve 203 in the slide cover 215 around the x axis is constrained by the pin 205.

(Process 3) The coil spring 213 is inserted into inside of the slide cover 215 from the bottom side of the end 215b of the slide cover 215. Alternatively, the female plug shell 202 is inserted into the coil spring 213 along the x axis and the coil spring 213 is installed on the periphery of the female plug shell 202.

(Process 4) The female plug shell 202 is inserted into the slide cover 215. At this time, the groove 203a and the pin 204 should be carefully engaged in order that rotation of the female plug shell 202 in the slide cover 215 around the x axis is constrained by the pin 204.

(Process 5) The coil spring 213 is compressed and the bottom end 215b of the slide cover 215 is caulked at the predetermined position. As a result, a caulking 210 can be obtained.

By applying the above-described structure and processes for setting up the female plug 200, the problem 4 can be solved, which enables to obtain a cable connector having higher reliability than a conventional one more easily and efficiently compared with a conventional device.

Second Embodiment

Figure 7:
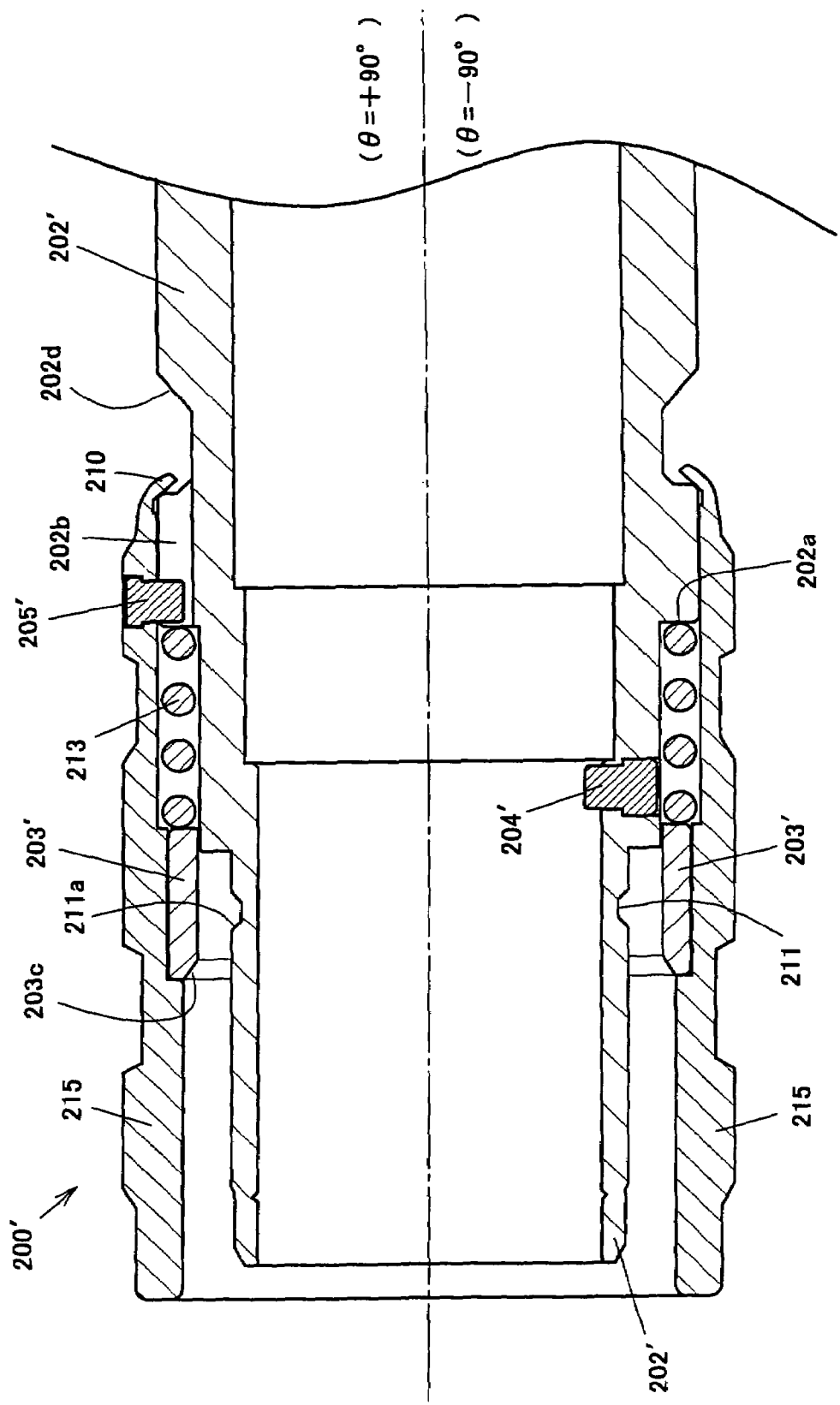
FIG. 7 is a sectional view of the x-y plane of a female plug shell 202' according to a second embodiment of the present invention

FIG. 7 is a sectional view of a female plug 200' at x-y plane seen from above (z>0) in a second embodiment of the present invention. In this embodiment, same coordinates as those used in the first embodiment are used. The female plug 200' is to be combined with the male plug 300 in the first embodiment and the first contact part which is not shown in FIG. 7 is also the same as that in the first embodiment. In other words, the female plug 200' shown in FIG. 7 has a structure alternative to that of the female plug 200 in FIG. 5B.

Difference between the female plug 200' in this embodiment and the female plug 200 in the first embodiment are listed below:

(1) The head of a pin 204' (the first projection part) is buried in the female plug shell 202', and the pin 204 is arranged only to constrain relative rotation of the insulator 209 and the female plug shell 202' shown in FIG. 4 around the x axis.

(2) A pin 205' (the second projection part) is formed in place of the pin 205 in the first embodiment. The pin 205' is guided to slide in the x axis direction according to the groove 202b (the second concave part) which is formed near coil spring contacting wall 202a of the female plug shell 202 where θ=+90°.

The pin 205' can be prevented from dropping off from the groove 202b by contacting the caulking 210 to an inclining plane 202d of the female plug shell 202'.

(3) The slide sleeve 203' comprises only the large ring of the slide sleeve 203 in the first embodiment, and does not have any groove.

Figure 8:
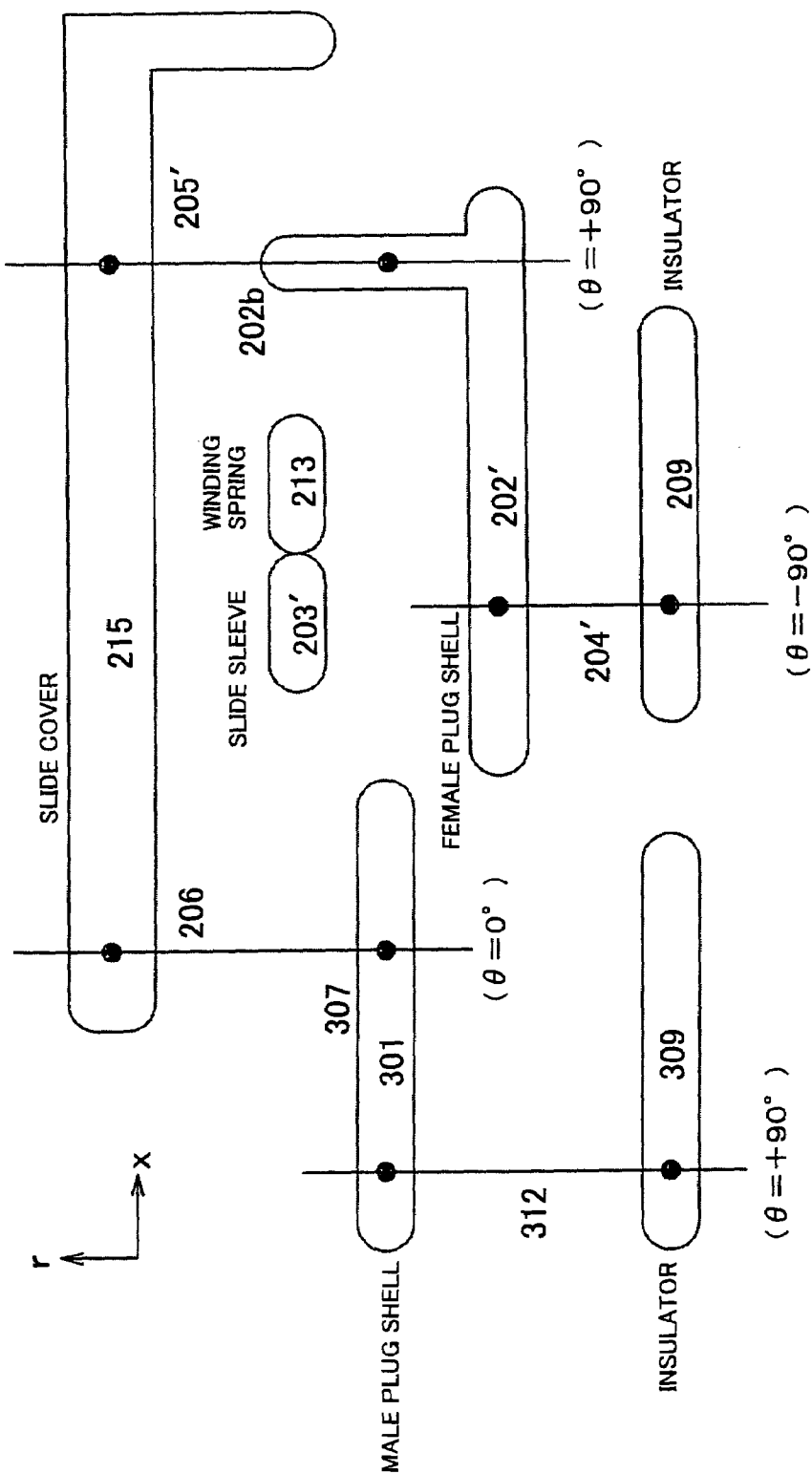
FIG. 8 is a logical view illustrating the structure for biding relative rotation of an insulator 309 and an insulator 209 (second embodiment).

FIG. 8 is a logical view illustrating the structure for binding relative rotation of the insulator 309 and the insulator 209 in the second embodiment. By forming the female plug 200' as explained in FIGS. 7 and 8, the slide sleeve may not be necessarily needed in order to constrain relative rotation of the insulator 309 and the insulator 209.

The female plug 200' has the following advantages:

(1) The slide sleeve 203' does not have any grooves, so it is easily formed.

(2) The female plug 200' can be constructed according to processes almost equivalent to the processes 1 to 5 in the first embodiment. Because the slide sleeve 203' has no groove, the female plug 200' can be constructed regardless of positioning (position matching to each pin) such grooves (grooves 203a and 203b) is not necessary. As a result, efficiency of constructing the plug can be improved.

(a) Here, the pin 205' is fixed at the position shown in FIG. 7 after forming the caulking 210. The pin 205' can easily be placed owing to the caulking 210, which is convenient. The position of the pin 205' (θ=90°) is matched to that of the groove 202b (θ=90°).

(b) Alternatively, the pin 205' may be fixed after inserting the slide sleeve 203' and the coil spring 213 in sequence into the slide cover 215 and compressing the coil spring 213 therein. In either case of (a) or (b), the slide cover 215 can be formed in advance and also it is not necessary to form any guide groove on the slide sleeve 203' and the slide cover 215.

(3) Because the slide sleeve 203' has a very simple structure, it is possible (easy) to form a simplified summary slide cover comprising a slide sleeve in advance in place of the slide sleeve 203'. As a result, components to be used can be further decreased and manufacturing time can be further reduced compared with a conventional device.

Third Embodiment

Figure 9A:
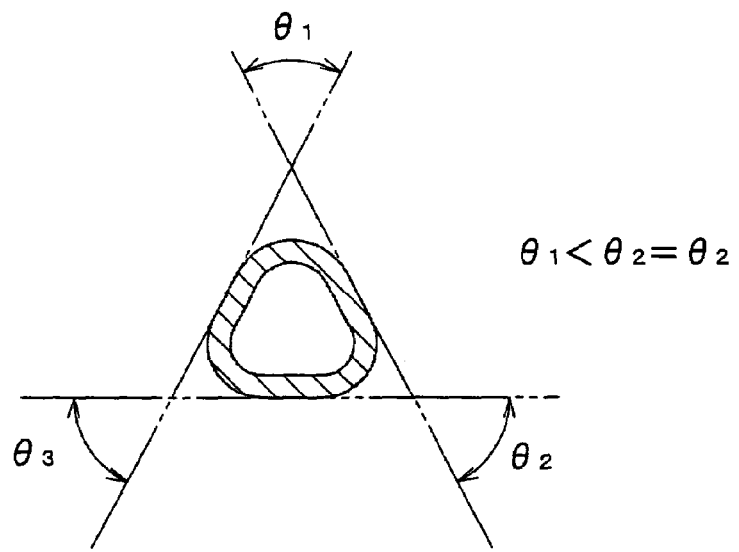
FIGS. 9A and 9B are sectional views of a male plug shell (301), a female plug shell (202), a slide cover (215), a slide sleeve (203) and insulators (209, 309) according to a third embodiment of the present invention.
Figure 9B:
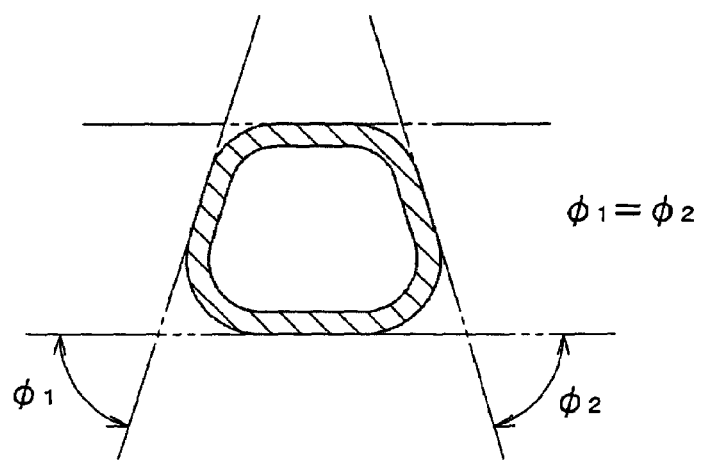

FIGS. 9A and 9B are sectional views seen from the vertical direction to the axis in each plug formed in cylindrical shape showing the male plug shell (301), the female plug shell (202/202'), the slide cover (215), the slide sleeve (203/203') and the insulator (209/309) in the third embodiment of the present invention. FIG. 9A illustrates a sectional view of an isosceles triangle each of whose angle is rounded, and FIG. 9B illustrates a sectional view of an isosceles trapezium each of whose angle is rounded.

In a conventional cable connector shown in FIGS. 17 to 22, a slide cover is formed in a plug 10 by combining an inner connecting ring 30 and an outer connecting ring 35 with each of their screw part (34 and 36). So each component listed above such as the slide cover is necessarily formed in a cylindrical shape.

In the present invention, however, the slide cover is formed combining with other components by caulking its ends. Accordingly, when each component is formed to have a sectional view shown in FIGS. 9A and 9B by applying the seventh aspect of the present invention, it becomes possible and easier to form the slide cover itself excluding other components.

And because a sectional plane of each component in cylindrical shape can be asymmetric with respect to rotation, the present invention may not necessarily require rotation constraining part explained in the first and the second embodiments. As a result, the cost for developing and producing a cable connector can be reduced.

Alternatively, the female plug shell 202 or the female plug shell 202' in the first and the second embodiments, respectively, may not necessarily be provided with a groove such as the steel ball engaging groove 211. For example, the contacting part 211a is formed at a slant which forms a step and its lower step is extended until it reaches the facing wall 202c of the pointed end of the male plug shell as shown in FIG. 3. Accordingly, the contacting part 211a may be formed on the slant forming the steps.

Fourth Embodiment

Figure 11:
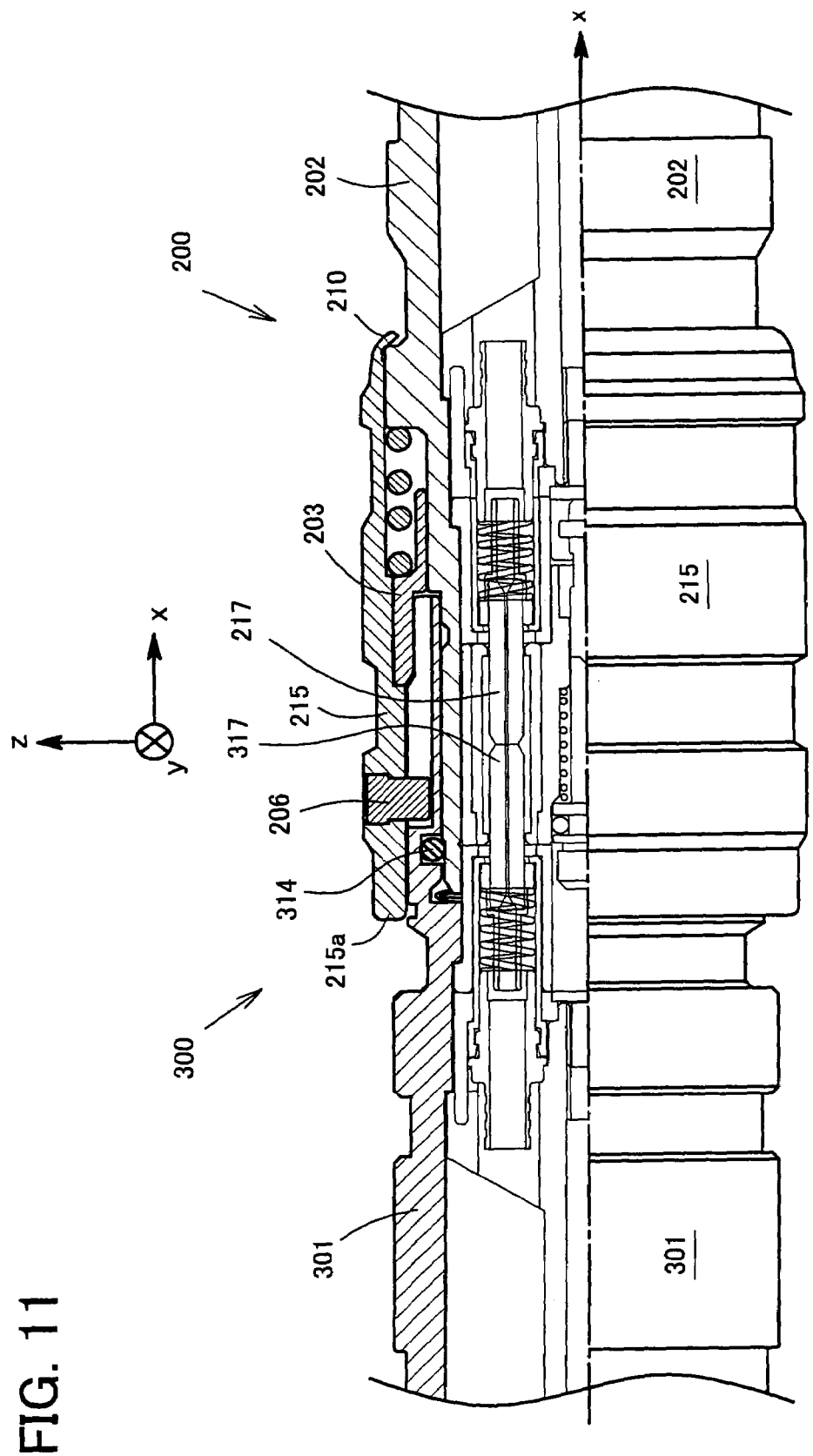
FIG. 11 is a sectional side view showing combination of the male plug 300 and the female plug 200 according to the embodiment of the present invention.

FIG. 11 is a sectional and side view of connecting the male plug 300 and the female plug 200 in this embodiment. With respect to this cable connector, mainly three components such as the male plug shell 301, the female plug shell 202 and the slide cover 215 each of which is formed in an approximately cylindrical shape are exposed outside.

The slide cover 215 comprises the slide sleeve 203 in an approximately cylinder shape and is disposed on the female plug shell 202 so that it can slide in the x axis direction.

The central axis of the approximately cylinder component corresponds to the x axis. The x coordinate at a normal location of the contact plane of each of the ferrules 217 and 317 formed on the right side and left side is x=0. As shown in FIG. 11, the pin 206 is placed on the x-y plane. Rotation angle around the x axis is represented by θ hereinafter. The rotation angle θ is measured from the positive z axis direction as a standard (θ=0). The rotation angle from θ=0 to the positive direction of the y axis is defined as θ>0, and the rotation angle to the negative direction of the y axis is defined as θ<0.

For example, the opening part 215a of the slide cover 215 is directed to the negative direction of the x axis, while the caulking 210 of the slide cover 215 which is located at the opposite side of the opening part 215a is directed to the positive direction of the x axis.

Figure 12:
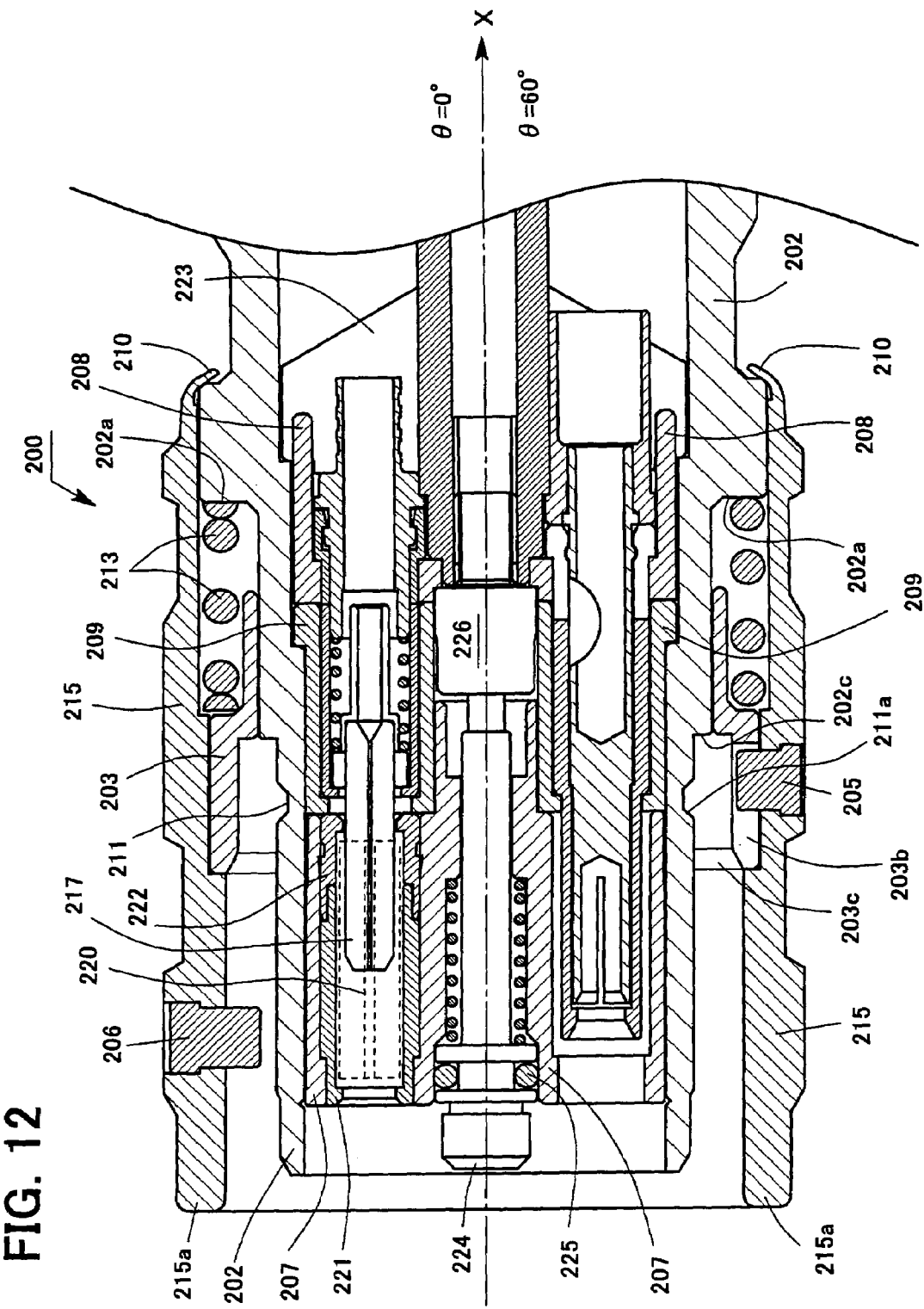
FIG. 12 is a sectional view of the female plug 200.

FIG. 12 is a sectional view of the female plug 200. In FIG. 12, the upper portion from the x axis representing the central line illustrates a sectional view of the female plug 200 where θ=0°, and the portion below the x axis illustrates a sectional view where θ=60°. A hook bolt 226 is shown in FIGS. 13A-13B and 14A-14D.

The coil spring 213 is sandwiched by the coil spring contacting wall 202a of the female plug shell 202 and the edge of the large ring of the slide sleeve 203, and is disposed inside of the slide cover 215 so that it can expand and contract freely. Sliding movement of the slide cover 215 in the positive direction of the x axis is restricted by the coil spring 213 or by means that the slide sleeve 203 is contacted with the coil spring contacting wall 202a, and slide of the slide cover 215 in the negative direction of the x axis is restricted by the caulking 210. The caulking 210 is formed by caulking the edge 215b of the slide cover 215 which is formed in an approximately ring shape and is placed at the bottom of the opening part of the slide cover 215, or at the opposite side of the opening part of the slide cover 215.

The pin 205 functions as a projection part which engages the groove 203b of the slide sleeve 203. The steel ball engaging groove 211 formed on the female plug shell 202 engages the steel ball which is formed around the opening part of the male plug shell 301 and is not shown in FIG. 12. The steel ball engaging groove 211 comprises the contacting part 211a which is formed to be contacted with the steel ball. The contacting part 211a formed on the female plug shell 202 constrains the steel ball from shifting in the negative direction of the x axis.

The first contact part of the female plug 200 side comprises the insulator 207, the insulator 208, the insulator 209 and components comprised in each of the insulator. Each of the insulator 207, the insulator 208 and the insulator 209 has an engaging part which constrains relative rotation around the x axis and is not shown in FIG. 12. The divide sleeve 220 is fixed by the divide sleeve holder 221 and the divide sleeve holder 222. In the divide sleeve holder 222, the ferrule 317 in the second contact part of the male plug 300 side shown in FIG. 11 contact with the ferrule 217 so that their end planes are contacted with each other.

Signs 223, 224, 225, and 226 represent a TM clamp, an adaptor shaft, an o-ring, and a hook bolt, respectively.

Figure 13A:
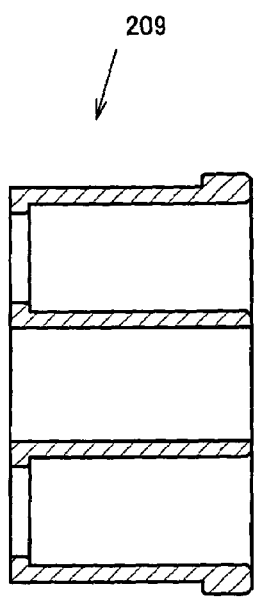
FIG. 13A is a sectional view of the insulator 209.
Figure 13B:
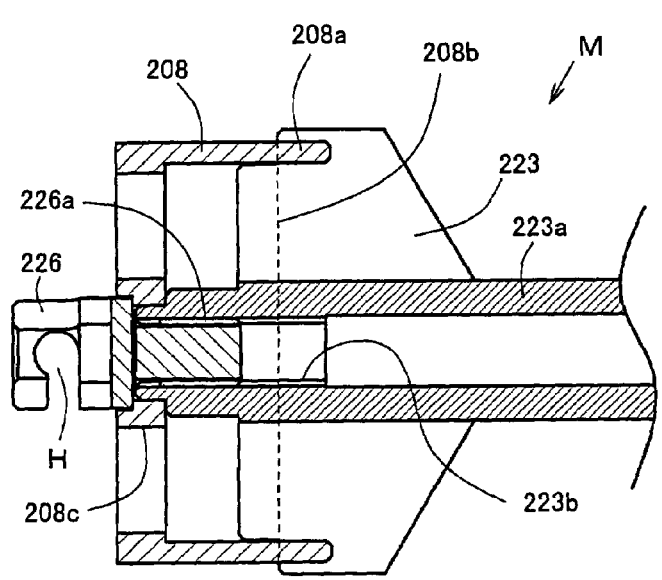
FIG. 13B is a sectional view of a pressure apparatus M, which presses the insulator 209 and fix it, seen from the same section as that of FIG. 13A.

FIG. 13A is a sectional view of the insulator 209 and FIG. 13B is a sectional view of a pressure apparatus M, which presses the insulator 209 and fixes it, seen from the same sectional plane as that of FIG. 13A. The insulator 209 is formed to have seven holes arranged in a solid cylindrical shape of the insulator 209 like honeycomb so that each of whose central axis is parallel to the x axis. Each of the insulator 208 is formed in an approximately tub shape or a cylindrical shape with a bottom plane on which seven circular holes are arranged like honeycomb. 208c represents the sidewall of each hole pierced at the bottom plane of the tub. 208b represents the circular edge of the upper portion the tub. 208a is a convex part which is projected from the edge 208b and combines with the TM clamp 223.

A base part of the TM clamp 223 is made of a pipe 223a in an approximately cylindrical shape. A male screw part 223b is formed at the inner wall of the pointed end-of the pipe 223a. The hook bolt 226 is fixed by screwing its male screw part 226a and the male screw part 223b formed at the pipe 223a together.

Further, a TM clamp 223 is fixed by screwing an end part screwing member, which is not shown in the figure and screws together with a female screw cut at the inner wall slightly longer diameter part of the female plug shell 202 shown in FIG. 12, and by being pressed through relaxing member.

Figure 14A:
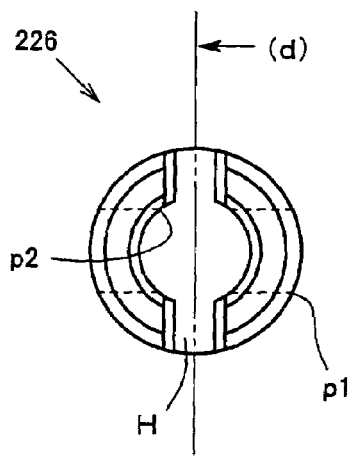
FIGS. 14A-14D are a front view (FIG. 14A), a side view (FIG. 14B), and sectional views of each part (FIGS. 14C and 14D) of a hook bolt 226.
Figure 14B:
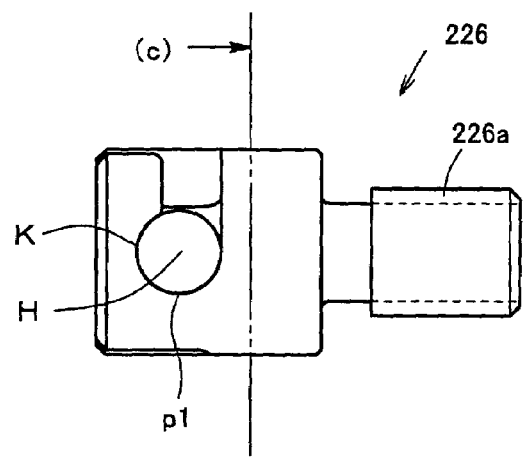
Figure 14C:
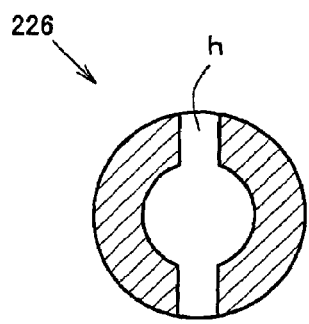
Figure 14D:
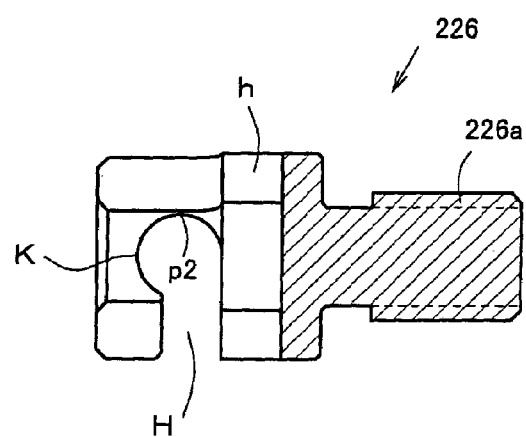
Figure 17:
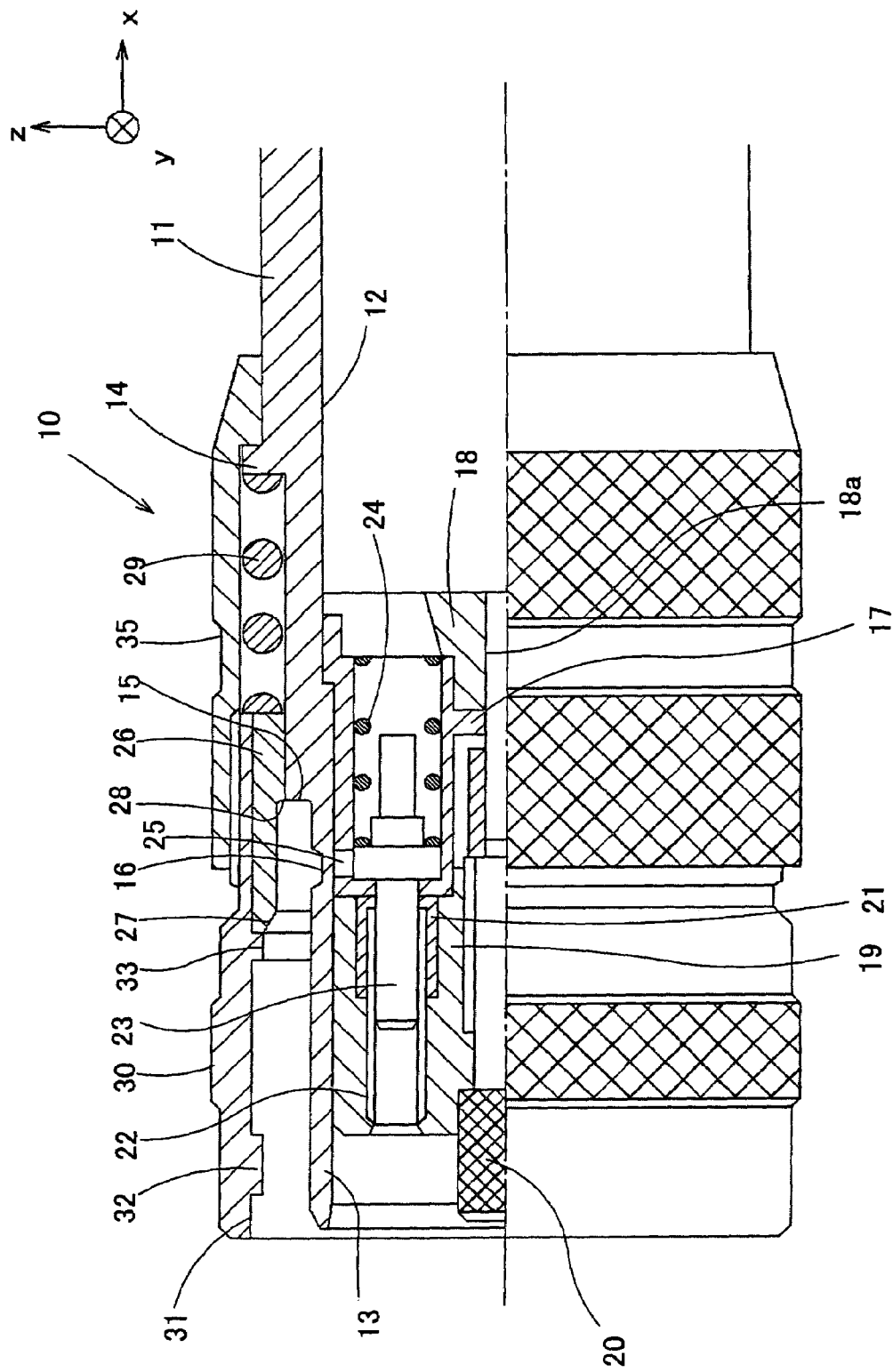
FIG. 17 is a sectional side view of a conventional female plug 10.
Figure 18:
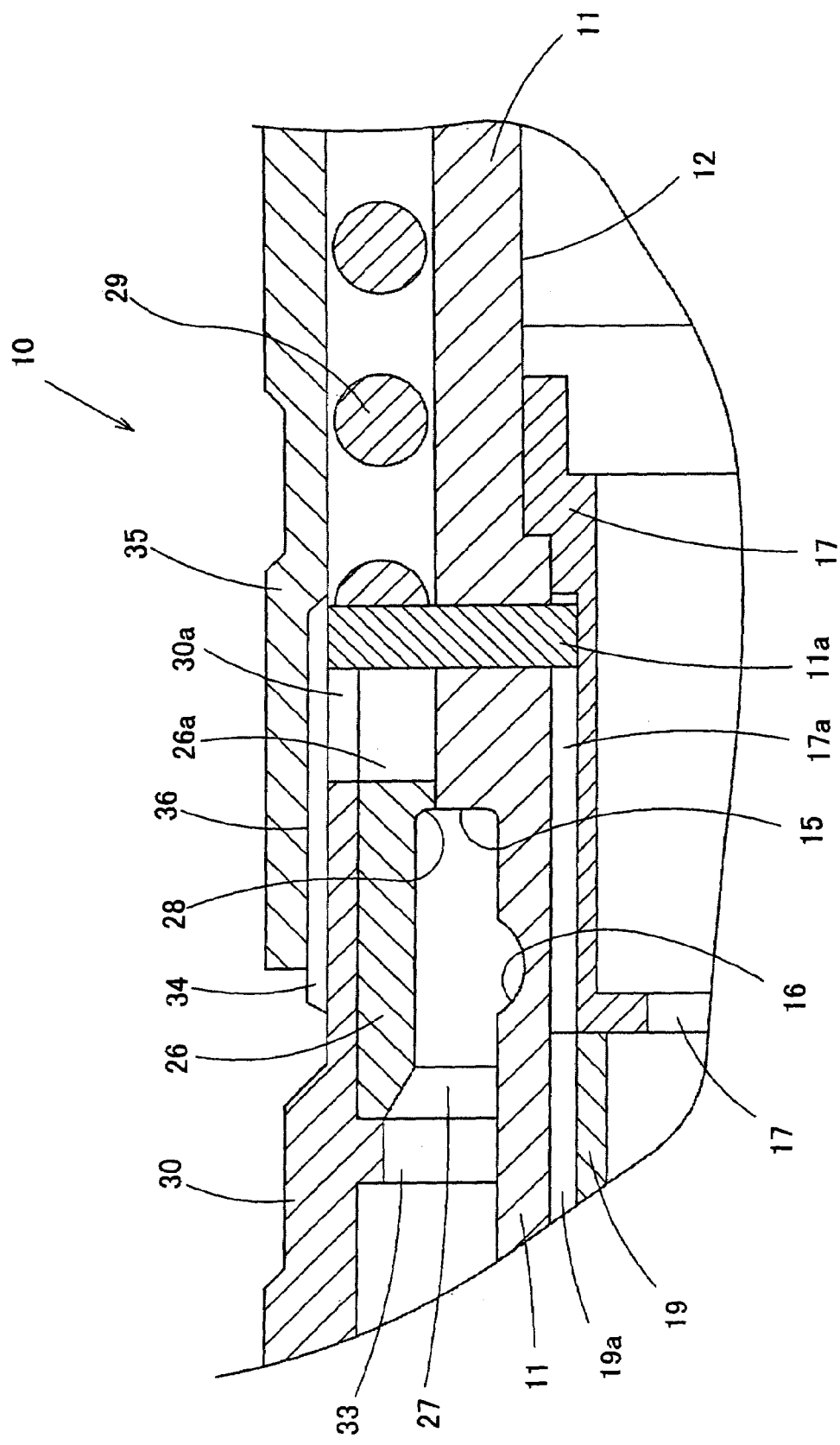
FIG. 18 is a partial sectional view of the conventional female plug 10 (an enlarged view of FIG. 17).
Figure 19A:
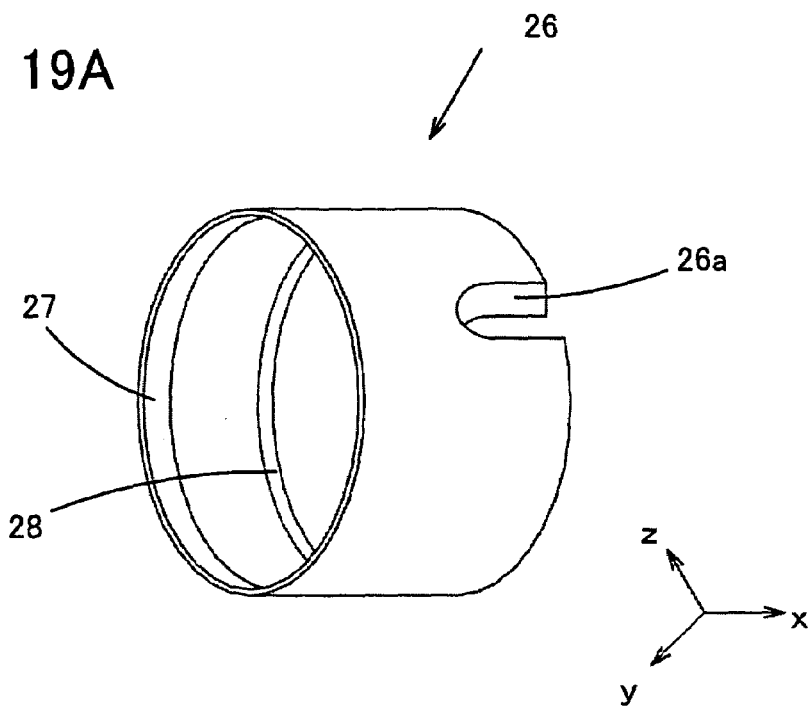
FIGS. 19A and 19B are a perspective view and a front view of a slide sleeve 26 formed in the conventional female plug 10.
Figure 19B:
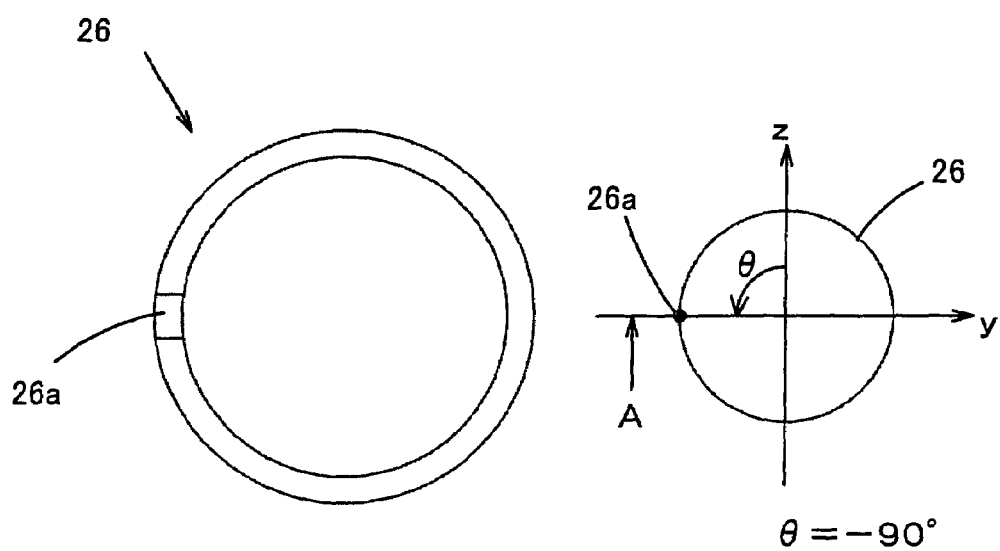
Figure 20:
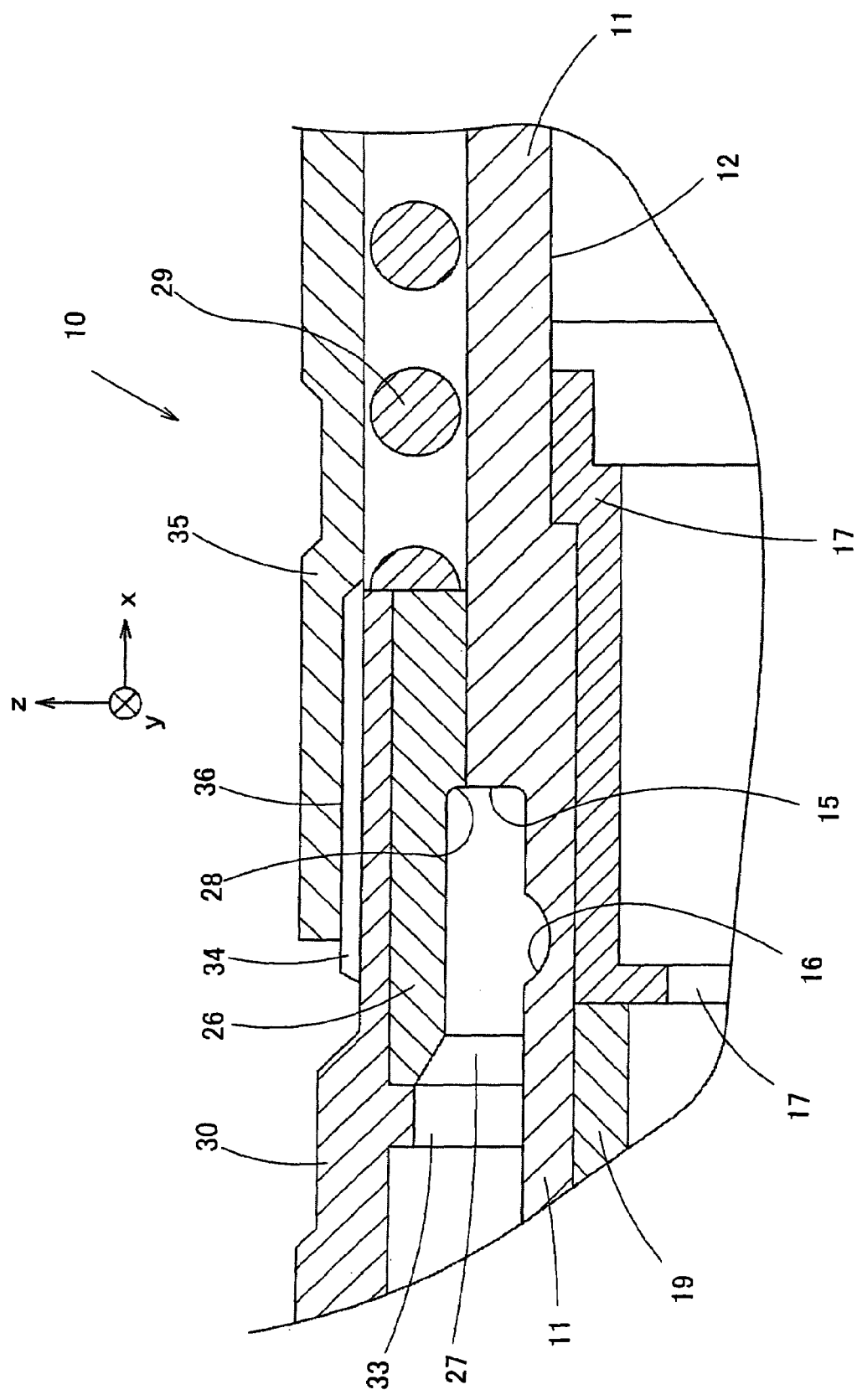
FIG. 20 is a partial sectional view (in normal condition) of the conventional female plug 10 seen from the direction A.

FIGS. 14A-14D are a front view (FIG. 14A), a side view (FIG. 14B), and sectional views of each part (FIGS. 14C and 14D) of the hook bolt 226. Each of point p1 and p2 shown in FIGS. 14A-14D represents a same position (point) on the hook bolt 226. Sign H represents a bayonet lock groove and sign h represents an engaging groove which is engaged by a flathead screwdriver. A portion of the engaging groove h which is shown in FIGS. 14C and 14D is formed by expanding the bayonet lock groove H to the end side of the bolt where the male screw part is formed. Accordingly, the bayonet lock groove H comprises the first guide groove (FIG. 14A) which guides the engaging pin 224a at the male side of the rock along the x axis, the second guide groove (FIGS. 14B and 14D) which guides the engaging pin 224a to the rotational direction around the x axis, and an approximately cylindrical round groove K (FIGS. 14B and 14D) which functions to maintain combination of the rock around the end part of the rotation along the second guide groove. Each of point p1 and p2 shown in FIGS. 14A-14D represents a correspondent end point of the round groove part K in the above-identified rotational direction.

By forming the hook bolt 226 to have such structure, a hook bolt 226 comprising a bayonet lock groove H which sufficiently engages the end A of the adaptor shaft 224 shown in FIG. 15B can be obtained.

FIG. 15A is a front view of the adaptor unit U of the present invention and FIG. 15B is a sectional view of a plane comprising the x axis there. The insulator 207 consists of a housing of the adaptor unit U and comprises seven holes 207a in total which are formed in approximately cylinder and are arranged to form honey comb. The divide sleeve 220 shown in FIG. 15B confronts, contacts and maintains each end of the ferrules 217 and 317 shown in FIG. 11. The divide sleeve 220 is fixed by the divide sleeve holders 221 and 222 and is kept in holes 207a placed both upside and downside of the adaptor shaft.

A circular concave part 207b is formed at the inner wall near the opening part which is placed at the end part A side of holes 207a formed both upside and downside of the adaptor shaft 224. The concave part 207b is engaged with the convex part 222a of the divide sleeve holder 222, which has a circular shape and arrowhead in the section. By injecting and pressing the divide sleeve holder 222 from the opening part, the concave part 207b of the insulator 207 and the convex part 222a of the divide sleeve holder 222 are engaged and are sufficiently fixed with each other. By employing such structure, it becomes unnecessary to use adhesion bond or form screw-in structure which is too complicated and has lower productivity in order to fix the divide sleeve holder 222, and also the divide sleeve 220 can be fixed in both of the upside and downside holes 207a easily and securely in a shorter time. That also improves productivity of the female plug 200.

A small shoulder 207c whose step is less than 1 mm of height is formed at the external wall of the approximately cylindrical insulator 207. This shoulder is formed in advance in order to decrease the diameter of the approximately cylindrical insulator 207 with expectation that the diameter of the approximately cylindrical insulator 207 become a little bit larger when the divide sleeve holder 222 is inserted and fixed. That enables to cancel increasing and decreasing of the dimension of the insulator 207, and assembling the insulator 207 may hardly be interrupted. The insulator 207 may preferably be made of materials, e.g., metals, which have higher rigidity than the insulator 207.

The structure with respect to the divide sleeve holder 222, the concave part 207b and the shoulder 207c is also useful for more common adaptor unit such as a female plug of an optical connector having no bayonet lock. That is, the structure with respect to pressing, inserting or fixing the divide sleeve holder 222 can also be remarkably useful for a common adaptor unit, and it is recognized as a new structure independent from a bayonet lock structure.

The adaptor shaft 224 is inserted to the central hole 207a of the insulator 207, and other contact members with respect to electric wiring are inserted to each of the other 4 holes 207a. The end portion B of the adaptor shaft 224, which is arranged at the end face to the male plug 300 (FIG. 11) side, has an operation part which can be rotated either by a flathead screwdriver or by fingers. On the contrary, the end portion A of the adaptor shaft 224 has an engaging pin 224a which has two concave parts and excellently binds with the bayonet lock groove H of the hook bolt 226 shown in FIG. 14.

When the bayonet lock is unlocked, the spring 227 pushes out the end portion B to the negative direction of the x axis by its elasticity. When the bayonet lock is locked, the engaging pin 224a is applied force to the negative direction of the x axis and pressed to the bayonet lock groove H formed at the hook bolt 226 shown in FIG. 13, which enables both the engaging pin 224a and the bayonet lock groove H to bind certainly with each other.

The o-ring 225 functions as a slip resistance which makes it easier to pull out the adaptor unit U by finger tips when the bayonet lock is unlocked and the end part B is pushed out. The spring 227 also functions as a slip resistance. In short, the o-ring 225 and the spring 227 also consist of the fingertip operation part in the present invention which makes it easier to pull out the adaptor unit.

FIG. 16 illustrates a sectional view and a sectional side view of the female plug 200 of the optical connector from which the adaptor unit U is separated. As shown in FIG. 16, the adaptor unit U can be held and pulled out by finger tips more easily compared with a conventional adaptor unit owing to the o-ring 225 and the screw 227 which form the fingertip operation part.

The convex part 207d of the insulator 207 is formed to bind the adaptor unit U to the insulator 209 in a predetermined correct angle. So a guide groove which guides the convex part 207d is formed in a predetermined angle at the insulator 209 side of the insulator 207.

By separating the adaptor unit U as shown in FIG. 16 only by using finger tips easily in a short time according to the above-described embodiment, large area of the ferrule 217 installed at the connection part of the optical fiber cable 230 is exposed to the opening part of the female plug shell 202. That is very convenient for cleaning the facet of the end portion of the ferrule 217.

Other Modified Embodiment

Figure 24A:
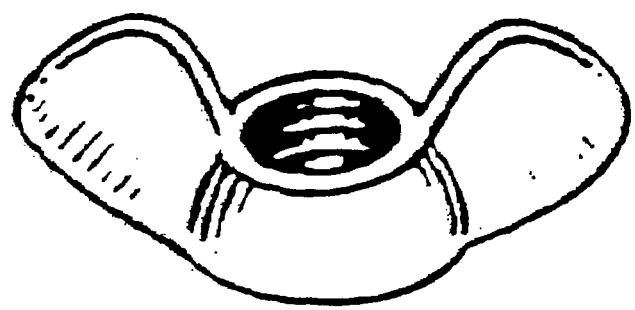
FIGS. 24A and 24B are perspective views of a butterfly nut and a butterfly screw both of which are well known and typical components.
Figure 24B:
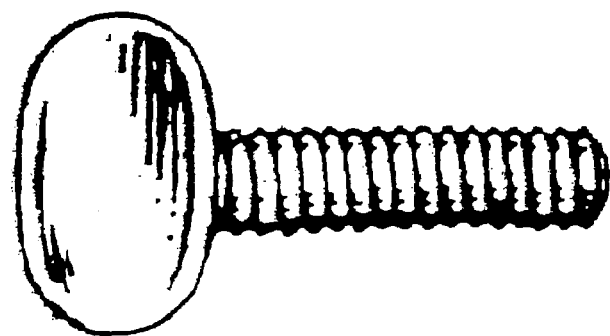

FIGS. 24A and 24B are perspective views of well-known and common fly nut and wing screw, respectively. In general, head of such a nut and a screw is called butterfly form. When the end portion of the end part B of the adaptor shaft 224 is formed in a butterfly form, the adaptor shaft 224 can be rotated more easily only by using fingers. When the end part B of the adaptor shaft 224 is formed in a butterfly-like form, an engaging groove for a flathead screwdriver can also be formed although it is not necessarily needed.

Alternatively, similar to the o-ring made of materials such as rubber and resin, other fingertip operation part optimum to operate an adaptor unit, e.g., a cap and a knob, may be formed at the fingertip operation part formed around the end portion B. Owing to such a structure, fingers hardly slip while pushing, screwing and pressing against to screw the end portion B, and it becomes easy to hold the end portion B with fingers and further fingers do not ache even by operating the end portion B again and again.

While the present invention has been described with reference to the above embodiments as the most practical and optimum ones, the present invention is not limited thereto, but may be modified as appropriate without departing from the spirit of the invention.

The present invention comprises all the contents in the priority claiming Japanese patent applications No. 2003-112649 and No. 2003-112918.

The invention claimed is:

1. A connector having a male plug comprising a male plug shell which is formed in an approximately tube shape and has a rotatable steel ball, which is able to rotate and move in radial direction, near its opening part and a female plug comprising a female plug shell which is formed in an approximately tube shape and is connected to said male plug shell and connected to a line which transmits electric power, electric signal, and optical signal, comprising:

an approximately tube slide sleeve which presses the rotatable steel ball installed around the opening part of said male plug shell from a periphery of said opening part to a centripetal direction;

a spring which presses back said slide sleeve along a central axis of said female plug shell until said slide sleeve presses said steel ball to said centripetal direction; and an approximately tube slide cover which comprises the slide sleeve and slides said slide sleeve against elastic force of said spring along the central axis, wherein a first projection part which engages said slide sleeve and a contacting part to which said steel ball can contact while said slide sleeve is pressing said steel ball to said centripetal direction are formed on a surface of a side wall of said female plug shell, said slide cover comprises a second projection part in order to constrain relative rotation of said slide cover and said female plug shell around the central axis, said slide cover can slide to said female plug shell by caulking an approximately ring shape end part of its bottom part placed at an opposite side of its opening part inward, and said slide sleeve engages said first projection part comprised in said female plug shell, said slide sleeve comprises a first concave part which guides said first projection part so that it can slide in the central axis direction and a second concave part which guides said second projection part so that it can slide in the central axis direction.

2. A connector according to claim 1, wherein said slide sleeve is formed in an approximately ring shape which comprises a large ring part of an approximately band shape and a small ring part of an approximately band shape having relatively smaller aperture and sharing the axis with said large ring part,
   wherein said slide sleeve is formed to have two-step ring structure whose cross-section vertical to the axis direction is approximately two steps, said first concave part is formed at said small ring part side of said slide sleeve so that its opening part faces the bottom of said slide sleeve, and
   said second concave part is formed at said large ring part side of said slide sleeve so that its opening part faces said opening part of said slide cover.

3. A female plug which comprises an approximately tube female plug shell connected to an approximately tube male plug shell, which has a rotatable steel ball which is installed around an opening part and can be shifted in the radial direction, comprising:
   an approximately tube slide sleeve which presses the rotatable steel ball installed around said opening part of said male plug shell from a periphery of said opening part to a centripetal direction;
   a spring which presses back said slide sleeve along a central axis of said female plug shell until said slide sleeve presses said steel ball to said centripetal direction; and
   an approximately tube slide cover which comprises the slide sleeve and slides said slide sleeve against elastic force of said spring along said central axis,
   wherein a first projection part which engages to said slide sleeve and a contacting part to which said steel ball can contact while said slide sleeve is pressing said steel ball to said centripetal direction are formed on a surface of a side wall of said female plug shell,
   said slide cover comprises a second projection part in order to constrain relative rotation of said slide cover and said female plug shell around the central axis,
   said slide cover can slide to said female plug shell by caulking an approximately ring shape end part of its bottom part placed at an opposite side of its opening part inward, and
   said slide sleeve engages to said first projection part comprises in said female plug shell, said slide sleeve comprises a first concave part which guides said first projection part so that it can slide in the central axis direction and a second concave part which guides the second projection part so that it can slide in the central axis direction.

4. A female plug according to claim 3, wherein said slide sleeve is formed in an approximately ring shape which comprises a large ring part of an approximately band shape and a small ring part of an approximately band shape having relatively smaller aperture and sharing the axis with said large ring part,
   wherein said slide sleeve is formed to have two-step ring structure whose cross-section vertical to the axis direction is approximately two steps,
   said first concave part is formed at said small ring part side of said slide sleeve so that its opening part faces said bottom of said slide sleeve, and
   said second concave part is formed at said large ring part side of said slide sleeve so that its opening part faces the opening part of said slide cover.

5. A connector having a male plug comprising a male plug shell which is formed in an approximately tube shape and has a rotable steel ball, which is able to rotate and move in radial direction, near its opening part and a female plug comprising a female plug shell which is formed in an approximately tube shape and is connected to said male plug shell and connected to a line which transmits electric power, electric signal, and optical signal, comprising:
   an approximately tube slide sleeve which presses the rotatable steel ball installed around the opening part of said male plug shell from a periphery of said opening part to a centripetal direction;
   a spring which presses back said slide sleeve along a central axis of said female plug shell until said slide sleeve presses said steel ball to said centripetal direction; and
   an approximately tube slide cover which can be slide to said female plug shell, comprises the slide sleeve and slides said slide sleeve against elastic force of said spring along the central axis,
   wherein said plug shell comprises a first projection part which engages said slide sleeve and a contacting part to which said steel ball can contact while said slide sleeve is pressing said steel ball to said centripetal direction are formed on a surface of a side wall of said female plug shell,
   said slide cover comprises a second projection part in order to constrain relative rotation of said slide cover and said female plug shell around the central axis, and
   said slide sleeve comprises a first concave part which guides said first projection part so that it can slide in the central axis direction and a second concave part which guides said second projection part so that it can slide in the central axis direction.

6. A connector according to claim 5, wherein said slide sleeve is formed in an approximately ring shape which comprises a large ring part of an approximately band shape and a small ring part of an approximately band shape having relatively smaller aperture and sharing the axis with said large ring part,
   wherein said slide sleeve is formed to have two-step ring structure whose cross-section vertical to the axis direction is approximately two steps, said first concave part is formed at said small ring part side of said slide sleeve so that its opening part faces the bottom of said slide sleeve, and
   said second concave part is formed at said large ring part side of said slide sleeve so that its opening part faces said opening part of said slide cover.

7. A female plug which comprises an approximately tube female plug shell connected to an approximately tube male plug shell, which has a rotatable steel ball which is installed around an opening part and can be shifted in the radial direction, comprising:
   an approximately tube slide sleeve which presses the rotatable steel ball installed around said opening part of said male plug shell from a periphery of said opening part to a centripetal direction;
   a spring which presses back said slide sleeve along a central axis of said female plug shell until said slide sleeve presses said steel ball to said centripetal direction; and
   an approximately tube slide cover which can be slide to said female plug shell, comprises the slide sleeve and slides said slide sleeve against elastic force of said spring along the central axis,
   wherein a first projection part which engages said slide sleeve and a contacting part to which said steel ball can contact while said slide sleeve is pressing said steel ball to said centripetal direction are formed on a surface of a side wall of said female plug shell, said slide cover comprises a second projection part in order to constrain relative rotation of said slide cover and said female plug shell around the central axis, and said slide sleeve engages said first projection part comprises in said female plug shell, said slide sleeve comprises a first concave part which guides said first projection part so that it can slide in the central axis direction and a second concave part which guides the second projection part so that it can slide in the central axis direction.

8. A female plug according to claim 7, wherein said slide sleeve is formed in an approximately ring shape which comprises a large ring part of an approximately band shape and a small ring part of an approximately band shape having relatively smaller aperture and sharing the axis with said large ring part, wherein said slide sleeve is formed to have two-step ring structure whose cross-section vertical to the axis direction is approximately two steps, said first concave part is formed at said small ring part side of said slide sleeve so that its opening part faces the bottom of said slide sleeve, and said second concave part is formed at said large ring part side of said slide sleeve so that its opening part faces said opening part of said slide cover.

* * * * *